United States Patent
Kim et al.

(10) Patent No.: US 8,522,188 B2
(45) Date of Patent: Aug. 27, 2013

(54) METHOD OF DESIGNING A SYSTEM-ON-CHIP INCLUDING A TAPLESS STANDARD CELL, DESIGNING SYSTEM AND SYSTEM-ON-CHIP

(71) Applicants: Hyung-Ock Kim, Seoul (KR); Jae-Han Jeon, Seoul (KR); Jung-Yun Choi, Hwaseong-si (KR); Kee-Sup Kim, Hwaseong-si (KR); Hyo-Sig Won, Suwon-si (KR)

(72) Inventors: Hyung-Ock Kim, Seoul (KR); Jae-Han Jeon, Seoul (KR); Jung-Yun Choi, Hwaseong-si (KR); Kee-Sup Kim, Hwaseong-si (KR); Hyo-Sig Won, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 13/626,121

(22) Filed: Sep. 25, 2012

(65) Prior Publication Data

US 2013/0185692 A1     Jul. 18, 2013

(30) Foreign Application Priority Data

Jan. 16, 2012 (KR) .................. 10-2012-0004714

(51) Int. Cl.
  *G06F 9/455* (2006.01)
  *G06F 17/50* (2006.01)
(52) U.S. Cl.
  USPC ........... 716/134; 716/108; 716/111; 716/138; 716/113; 716/132; 714/700; 714/718; 714/745
(58) Field of Classification Search
  USPC ................. 716/108, 111, 104, 113, 132, 134; 714/745, 718, 700
  See application file for complete search history.

(56) References Cited

U.S. PATENT DOCUMENTS

| | | | |
|---|---|---|---|
| 6,966,022 B1 * | 11/2005 | Stenfort et al. | 714/745 |
| 8,255,851 B1 * | 8/2012 | Baransy et al. | 716/113 |
| 2008/0143423 A1 | 6/2008 | Komatsu et al. | |
| 2008/0174359 A1 | 7/2008 | Osada et al. | |
| 2009/0243667 A1 | 10/2009 | Park et al. | |
| 2012/0068754 A1 * | 3/2012 | Su et al. | 327/285 |
| 2012/0102448 A1 * | 4/2012 | Haugestuen et al. | 716/134 |

FOREIGN PATENT DOCUMENTS

| | | | |
|---|---|---|---|
| JP | 2008153415 A | 7/2008 | |
| JP | 2008182004 A | 8/2008 | |
| KR | 20090102623 A | 9/2009 | |

* cited by examiner

*Primary Examiner* — Paul Dinh
*Assistant Examiner* — Brian Ngo
(74) *Attorney, Agent, or Firm* — Harness, Dickey & Pierce, P.L.C.

(57) ABSTRACT

In a method of designing a system-on-chip including a tapless standard cell to which body biasing is applied, a slow corner timing parameter is adjusted to increase a slow corner of an operating speed distribution for the system-on-chip by reflecting forward body biasing, and a fast corner timing parameter is adjusted to decrease a fast corner of the operating speed distribution for the system-on-chip by reflecting reverse body biasing. The system-on-chip including the tapless standard cell is implemented based on the adjusted slow corner timing parameter corresponding to the increased slow corner and the adjusted fast corner timing parameter corresponding to the decreased fast corner. The slow corner timing parameter corresponds to a lowest value of an operating speed design window of the system-on-chip, and, the fast corner timing parameter corresponds to a highest value of the operating speed design window of the system-on-chip.

19 Claims, 17 Drawing Sheets

FIG. 5

```
cell(CELL_NAME){                          345a
    ⋮
    pin(OUPUT_PIN_NAME){
        ⋮
        timing( ){
            related pin:"INPUT_PIN_NAME"
            cell_fall(LOOKUP_TABLE_FORMAT){
                index_1("IS1,IS2,IS3,IS4");
                index_2("OL1,OL2,OL3");
                values("D1,D2,D3,D4",
                       "D5,D6,D7,D8",          347a
                       "D9,D10,D11,D12");
            }
            cell_rise(LOOKUP_TABLE_FORMAT){
                ⋮
            }
        }
    }
}
```

FIG. 12

```
970
971 ─── set_timing_drate -cell_delay [expr $original_acvm_rvt + $wr_com_rvt] $RVT_CELL
    ...
973 ─── set_timing_drate -cell_delay [expr $original_acvm_lvt + $wr_com_lvt] $LVT_CELL
    ...
975 ─── set_clock_uncertainty ?hold [expr $original_hold_rvt + $wr_hold_rvt] $RVT_FF_PINS
977 ─── set_clock_uncertainty ?hold [expr $original_hold_lvt + $wr_hold_lvt] $LVT_FF_PINS
    ...
```

METHOD OF DESIGNING A SYSTEM-ON-CHIP INCLUDING A TAPLESS STANDARD CELL, DESIGNING SYSTEM AND SYSTEM-ON-CHIP

CROSS-REFERENCE TO RELATED APPLICATIONS

This U.S. non-provisional application claims the benefit of priority under 35 U.S.C. §119 to Korean Patent Application No. 2012-0004714 filed on Jan. 16, 2012 in the Korean Intellectual Property Office (KIPO), the entire contents of which are incorporated herein by reference.

BACKGROUND

1. Technical Field

Example embodiments relate to circuit designs. More particularly, example embodiments relate to methods of designing system-on-chips including tapless standard cells, designing systems and system-on-chips.

2. Description of the Related Art

An integrated circuit, such as a system-on-chip, may have an operating speed distribution due to a process variation. As the semiconductor manufacturing process has been continuously developed, the operating speed distribution for the system-on-chip may widen, a ratio of power consumption to an operating speed may increase, and a defect rate of the system-on-chip may increase.

SUMMARY

Some example embodiments provide a method of designing a system-on-chip capable of improving an operating speed and reducing power consumption of the system-on-chip.

Some example embodiments provide a designing system capable of improving an operating speed and reducing power consumption of a system-on-chip.

Some example embodiments provide a system-on-chip having an improved operating speed and reduced power consumption.

According to example embodiments, in a method of designing a system-on-chip including a tapless standard cell to which body biasing is applied, a slow corner changing step is performed such that a slow corner timing parameter is adjusted to increase a slow corner of an operating speed distribution for the system-on-chip by reflecting forward body biasing, a fast corner changing step is performed such that a fast corner timing parameter is adjusted to decrease a fast corner of the operating speed distribution for the system-on-chip by reflecting reverse body biasing, and an implementing step is performed such that the system-on-chip including the tapless standard cell is implemented based on the adjusted slow corner timing parameter corresponding to the increased slow corner and the adjusted fast corner timing parameter corresponding to the decreased fast corner. The slow corner timing parameter corresponds to a lowest value of an operating speed design window of the system-on-chip, and the fast corner timing parameter corresponds to a highest value of the operating speed design window of the system-on-chip.

In some example embodiments, the slow corner timing parameter may include at least one of a slow corner cell delay, a slow corner setup margin and a slow corner hold margin of the tapless standard cell, and the fast corner timing parameter may include at least one of a fast corner cell delay, a fast corner setup margin and a fast corner hold margin of the tapless standard cell.

In some example embodiments, the slow corner changing step may include a step of adjusting a slow corner cell delay of the tapless standard cell.

In some example embodiments, the slow corner cell delay may be decreased to increase the slow corner.

In some example embodiments, the fast corner changing step may include a step of adjusting a fast corner cell delay of the tapless standard cell.

In some example embodiments, the fast corner cell delay may be increased to decrease the fast corner.

In some example embodiments, the implementing step may include a step of implementing the system-on-chip including the tapless standard cell by using a tapless standard cell library including the adjusted slow corner timing parameter and the adjusted fast corner timing parameter.

In some example embodiments, the implementing step may include a step of generating a tapless standard cell library including the adjusted slow corner timing parameter and the adjusted fast corner timing parameter, a step of generating a gate level netlist by synthesizing a register-transfer level netlist for the system-on-chip based on the tapless standard cell library, a step of placing and routing components of the system-on-chip based on the tapless standard cell library and the gate level netlist, and a step of verifying a timing of the system-on-chip based on the adjusted slow corner timing parameter and the adjusted fast corner timing parameter included in the tapless standard cell library.

In some example embodiments, the implementing step may include a step of implementing the system-on-chip including the tapless standard cell by using a timing adjusting script for applying the adjusted slow corner timing parameter and the adjusted fast corner timing parameter.

In some example embodiments, the implementing step may include a step of generating a timing adjusting script for applying the adjusted slow corner timing parameter and the adjusted fast corner timing parameter, a step of generating a gate level netlist by synthesizing a register-transfer level netlist for the system-on-chip, a step of applying the adjusted slow corner timing parameter and the adjusted fast corner timing parameter to the gate level netlist in response to the timing adjusting script, a step of placing and routing components of the system-on-chip based on the gate level netlist to which the adjusted slow corner timing parameter and the adjusted fast corner timing parameter are applied, and a step of verifying a timing of the system-on-chip based on the adjusted slow corner timing parameter and the adjusted fast corner timing parameter that are applied in response to the timing adjusting script.

According to example embodiments, a designing system for designing a system-on-chip including a tapless standard cell to which body biasing is applied includes a memory device configured to load a design tool for designing the system-on-chip, and a processor configured to execute the design tool loaded in the memory device. The design tool executed by the processor causes the designing system to perform a slow corner changing step of adjusting a slow corner timing parameter to increase a slow corner of an operating speed distribution for the system-on-chip by reflecting forward body biasing, a fast corner changing step of adjusting a fast corner timing parameter to decrease a fast corner of the operating speed distribution for the system-on-chip by reflecting reverse body biasing, and an implementing step of implementing the system-on-chip including the tapless standard cell based on the adjusted slow corner timing parameter corresponding to the increased slow corner and the adjusted fast corner timing parameter corresponding to the decreased fast corner. The slow corner timing parameter corresponds to a lowest value of an operating speed design window of the system-on-chip, and the fast corner timing parameter corresponds to a highest value of the operating speed design window of the system-on-chip.

In some example embodiments, the design tool executed by the processor may implement the system-on-chip including the tapless standard cell by using a tapless standard cell library including the adjusted slow corner timing parameter and the adjusted fast corner timing parameter.

In some example embodiments, the design tool executed by the processor may implement the system-on-chip including the tapless standard cell by using a timing adjusting script for applying the adjusted slow corner timing parameter and the adjusted fast corner timing parameter.

According to example embodiments, a system-on-chip includes at least one tapless standard cell to which body biasing is applied, and a body bias generator configured to apply a body bias voltage to the tapless standard cell. The system-on-chip is implemented by performing a slow corner changing step of adjusting a slow corner timing parameter to increase a slow corner of an operating speed distribution for the system-on-chip by reflecting forward body biasing, a fast corner changing step of adjusting a fast corner timing parameter to decrease a fast corner of the operating speed distribution for the system-on-chip by reflecting reverse body biasing, and an implementing step of implementing the system-on-chip including the tapless standard cell based on the adjusted slow corner timing parameter corresponding to the increased slow corner and the adjusted fast corner timing parameter corresponding to the decreased fast corner. The slow corner timing parameter corresponds to a lowest value of an operating speed design window of the system-on-chip, and the fast corner timing parameter corresponds to a highest value of the operating speed design window of the system-on-chip.

In some example embodiments, the body bias generator may be configured to apply a forward body bias voltage to the tapless standard cell if the system-on-chip is in the increased slow corner, and may be configured to apply a reverse body bias voltage to the tapless standard cell if the system-on-chip is in the decreased fast corner.

In some example embodiments, the body bias generator may be configured to apply the forward body bias voltage lower than a power supply voltage to a body of a PMOS transistor included in the tapless standard cell if the system-on-chip is in the increased slow corner, and may be configured to apply the reverse body bias voltage higher than the power supply voltage to the body of the PMOS transistor included in the tapless standard cell if the system-on-chip is in the decreased fast corner.

In some example embodiments, the body bias generator may be configured to apply the forward body bias voltage high than a power supply voltage to a body of an NMOS transistor included in the tapless standard cell if the system-on-chip is in the increased slow corner, and may be configured to apply the reverse body bias voltage lower than the power supply voltage to the body of the NMOS transistor included in the tapless standard cell if the system-on-chip is in the decreased fast corner.

According to example embodiments, in a method of designing a system-on-chip to which dynamic voltage frequency scaling is applied and which includes a tapless standard cell to which body biasing is applied, a slow corner changing step is performed such that a slow corner timing parameter is adjusted to increase a slow corner of a first operating speed distribution for the system-on-chip according to a highest power supply voltage among a plurality of power supply voltages and a highest clock frequency among a plurality of clock frequencies by reflecting forward body biasing, a fast corner changing step is performed such that a fast corner timing parameter is adjusted to decrease a fast corner of a second operating speed distribution for the system-on-chip according to a lowest power supply voltage among the plurality of power supply voltages and a lowest clock frequency among the plurality of clock frequencies by reflecting reverse body biasing, and an implementing step is performed such that the system-on-chip including the tapless standard cell is implemented based on the adjusted slow corner timing parameter corresponding to the increased slow corner and the adjusted fast corner timing parameter corresponding to the decreased fast corner. The slow corner timing parameter corresponds to a lowest value of an operating speed design window of the system-on-chip, and the fast corner timing parameter corresponds to a highest value of the operating speed design window of the system-on-chip.

According to example embodiments, a method of designing a system-on-chip including a tapless standard cell may include determining an operating speed design window having a range defined by a slow corner timing parameter and a fast corner timing parameter, the slow corner timing parameter corresponding to a lowest value of the operating speed design window of the system-on-chip, the fast corner timing parameter corresponding to a highest value of the operating speed design window of the system-on-chip; and implementing the system-on-chip including the tapless standard cell by including in the system-on-chip a body bias generator configured to adjust an operating speed of the system-on-chip cell by applying a body bias voltage to the tapless cell based on the determined operating speed design window.

According to example embodiments, the system-on-chip is implemented by configuring the body bias generator to receive information indicating a comparison between a current operating speed of the system-on-chip and at least one of the slow corner timing parameter and the fast corner timing parameter, and configuring the body bias generator to apply the body bias voltage to the tapless standard cell based on the comparison.

According to example embodiments, the system-on-chip is implemented by configuring the body bias generator to apply the body bias voltage to the tapless standard cell such that the operating speed of the system-on-chip is adjusted to fall within the operating speed design window.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

FIG. 5 is a diagram for describing an example of a tapless standard cell library including a timing parameter adjusted according to a design window reduction.

FIG. 12 is a diagram for describing an example of a timing adjusting script for applying a timing parameter adjusted according to a design window reduction.

DETAILED DESCRIPTION OF THE EMBODIMENTS

Figure 1:
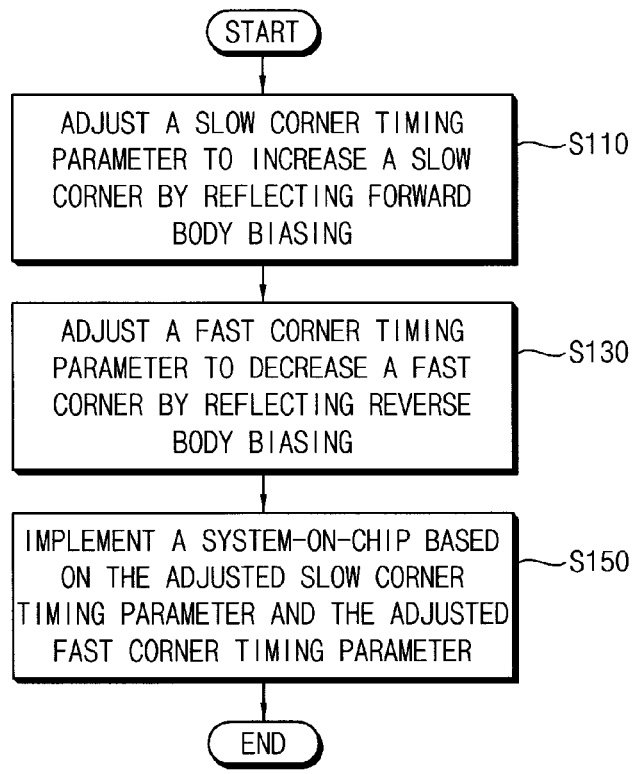
FIG. 1 is a flow chart illustrating a method of designing a system-on-chip including a tapless standard cell according to example embodiments.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In the drawings, the sizes and relative sizes of layers and regions may be exaggerated for clarity.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a flow chart illustrating a method of designing a system-on-chip including a tapless standard cell according to example embodiments.

Referring to FIG. 1, in a method of designing a system-on-chip including a tapless standard cell to which body biasing is applied, a slow corner timing parameter of the tapless standard cell is adjusted to increase a slow corner of an operating speed distribution for the system-on-chip by reflecting forward body biasing (FBB) (S110). For example, in order to change a first slow corner of the operating speed distribution, which is a conventional slow corner of the operating speed distribution, to a second slow corner faster than the first slow corner by reflecting the FBB, the slow corner timing parameter may be adjusted to correspond to the second slow corner. The slow corner timing parameter may include at least one of a slow corner cell delay (i.e., a cell delay of the tapless standard cell with respect to the slow corner), a slow corner setup margin (i.e., a setup margin of the tapless standard cell with respect to the slow corner) and a slow corner hold margin (i.e., a hold margin of the tapless standard cell with respect to the slow corner) of the tapless standard cell. For example, to increase the slow corner, the slow corner cell delay of the tapless standard cell may be decreased to correspond to the increased slow corner. Here, the increase of the slow corner means increases of an operating speed upper limit and/or an operating speed lower limit of the slow corner. That is, the increased slow corner may have an operating speed lower limit faster than an operating speed lower limit of the conventional slow corner and/or an operating speed upper limit faster than an operating speed upper limit of the conventional slow corner. In some example embodiments, the operating speed lower limit of the increased slow corner may be determined to be substantially the same as the operating speed upper limit of the conventional slow corner, and the operating speed upper limit of the increased slow corner may be determined by adding an operating speed increment according to the FBB to the operating speed lower limit of the increased slow corner. In some example embodiments, the operating speed distribution for the system-on-chip may be obtained by manufacturing any semiconductor device (e.g., a ring oscillator, an inverter chain, etc.) as a sample via a processing line for manufacturing the system-on-chip and by measuring an operating speed distribution of the sample.

A fast corner timing parameter of the tapless standard cell is adjusted to decrease a fast corner of the operating speed distribution for the system-on-chip by reflecting reverse body biasing (RBB) (S130). For example, in order to change a first fast corner of the operating speed distribution, which is a conventional fast corner of the operating speed distribution, to a second fast corner slower than the first fast corner by reflecting the RBB, the fast corner timing parameter may be adjusted to correspond to the second fast corner. The fast corner timing parameter may include at least one of a fast corner cell delay (i.e., a cell delay of the tapless standard cell with respect to the fast corner), a fast corner setup margin (i.e., a setup margin of the tapless standard cell with respect to the fast corner) and a fast corner hold margin (i.e., a hold margin of the tapless standard cell with respect to the fast corner) of the tapless standard cell. For example, to decrease the fast corner, the fast corner cell delay of the tapless standard cell may be increased to correspond to the decreased fast corner. Here, the decrease of the fast corner means decreases of an operating speed upper limit and/or an operating speed lower limit of the fast corner. That is, the decreased fast corner may have an operating speed lower limit slower than an operating speed lower limit of the conventional fast corner and/or an operating speed upper limit slower than an operating speed upper limit of the conventional fast corner. In some example embodiments, the operating speed upper limit of the decreased fast corner may be determined to be substantially the same as the operating speed lower limit of the conventional fast corner, and the operating speed lower limit of the decreased fast corner may be determined by subtracting an operating speed decrement according to the RBB from the operating speed upper limit of the decreased fast corner.

The system-on-chip including the tapless standard cell may be implemented based on the adjusted slow corner timing parameter corresponding to the increased slow corner and the adjusted fast corner timing parameter corresponding to the decreased fast corner (S150). In some example embodiments, the system-on-chip may be implemented using a tapless standard cell library including the adjusted slow corner timing parameter and the adjusted fast corner timing parameter of the tapless standard cell. For example, to implement the system-on-chip, the tapless standard cell library including the adjusted slow corner timing parameter and the adjusted fast corner timing parameter may be generated, a gate level netlist may be generated by synthesizing a register-transfer level (RTL) netlist for the system-on-chip based on the tapless standard cell library, components of the system-on-chip may be placed and routed based on the tapless standard cell library and the gate level netlist, and a timing of the system-on-chip where the components are placed and routed may be verified based on the adjusted slow corner timing parameter and the adjusted fast corner timing parameter included in the tapless standard cell library. After the verification of the timing of the system-on-chip is completed, the system-on-chip may be manufactured and packaged based on layout data for the system-on-chip. In other example embodiments, the system-on-chip may be implemented using a timing adjusting script for applying the adjusted slow corner timing parameter and the adjusted fast corner timing parameter. The timing adjusting script may be applied during the synthesis, the placement and routing and/or the static timing analysis of the system-on-chip, and thus the system-on-chip including the tapless standard cell to which the adjusted slow corner timing parameter and the adjusted fast corner timing parameter are applied may be implemented and manufactured.

As described above, since the slow corner timing parameter may be adjusted to correspond to the increased slow corner that is faster than the conventional slow corner by reflecting the forward body biasing, the system-on-chip implemented based on the adjusted slow corner timing parameter may have an increased operating speed. For example, the slow corner cell delay of the tapless standard cell may be decreased according to the increase of the slow corner, and thus the operating speed of the system-on-chip may increase. Further, since the cell delay is decreased, a size and/or a wiring length of the tapless standard cell may be decreased, and the entire size of the system-on-chip may be decreased. Further, since the fast corner timing parameter may be adjusted to correspond to the decreased fast corner that is slower than the conventional fast corner by reflecting the reverse body biasing, the system-on-chip implemented based on the adjusted fast corner timing parameter may have reduced power consumption. Although the slow corner is increased and the fast corner is decreased, a yield for the system-on-chip may be substantially maintained since the forward body biasing is applied to the system-on-chip in the increased slow corner and the reverse body biasing is applied to the system-on-chip in the decreased fast corner. Therefore, the method of designing the system-on-chip including the tapless standard cell according to example embodiments may improve the operating speed of the system-on-chip and may reduce the power consumption and the size of the system-on-chip while maintaining the yield for the system-on-chip.

A gap between the slow corner and the fast corner may be referred to as a "design window", and narrowing the gap between the slow corner and the fast corner to increase the operating speed and/or to decrease the power consumption may be referred to as a "design window reduction". In some example embodiments, the design window reduction may be performed by increasing the slow corner and/or by decreasing the fast corner. Accordingly, as used herein, a "slow corner timing parameter" may represent a lowest value or speed of an operating speed design window of a system-on-chip, and a "fast corner timing parameter" may represent a highest value or speed of the operating speed design window of the system-on-chip, where the operating speed design window is, for example, a desired range of operating speeds for the system-on-chip.

Figure 2A:
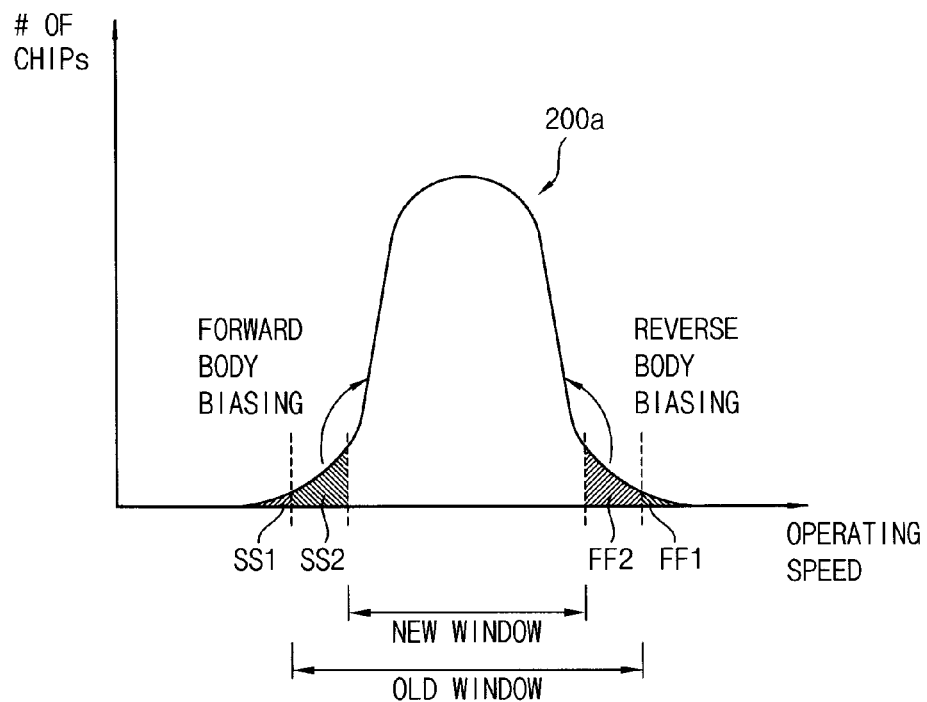
FIG. 2A is a diagram illustrating an example of a design window reduction performed by a design method according to example embodiments.

FIG. 2A is a diagram illustrating an example of a design window reduction performed by a design method according to example embodiments.

Referring to FIG. 2A, system-on-chips may have an operating speed distribution 200a due to a process variation although the system-on-chips are manufactured by the same process. Typically, system-on-chips in a first slow corner SS1 (e.g., a conventional slow corner) of the operating speed distribution 200a and system-on-chips in a first fast corner FF1 (e.g., a conventional fast corner) of the operating speed distribution 200a may be discarded as defective products.

In a design method according to example embodiments, the first slow corner SS1 of the operating speed distribution 200a may be increased to a second slow corner SS2 faster than the first slow corner SS1 by reflecting forward body biasing that is to be applied to the system-on-chips, and the first fast corner FF1 of the operating speed distribution 200a may be decreased to a second fast corner FF2 slower than the first fast corner FF1 by reflecting reverse body biasing that is to be applied to the system-on-chips.

At least one tapless standard cell included in each system-on-chip may be implemented and manufactured based on a slow corner timing parameter adjusted to correspond to the second slow corner SS2 and a fast corner timing parameter adjusted to correspond to the second fast corner FF2. In an example of adjusting a cell delay of the tapless standard cell with respect to each corner, a slow corner cell delay of the tapless standard cell corresponding to an operating speed upper limit of the first slow corner SS1 may be adjusted to correspond to the an operating speed upper limit of the second slow corner SS2, and a fast corner cell delay of the tapless standard cell corresponding to an operating speed lower limit of the first fast corner FF1 may be adjusted to correspond to the an operating speed lower limit of the second fast corner FF2. The adjusted (i.e., increased) slow corner cell delay and the adjusted (i.e., decreased) fast corner cell delay may be applied during the synthesis, the placement and routing and/or the static timing analysis of the system-on-chip including the tapless standard cell. Accordingly, the system-on-chip having the improved operating speed and the reduced power consumption may be implemented and manufactured by decreasing the slow corner cell delay and by increasing the fast corner cell delay.

Among the system-on-chips implemented and manufactured by the design method according to example embodiments, the forward body biasing may be applied to the system-on-chips in the second slow corner SS2 and the reverse body biasing may be applied to the system-on-chips in the second fast corner FF2. Accordingly, although the slow corner is increased from the first slow corner SS1 to the second slow corner SS2, and the fast corner is decreased from the first fast corner FF1 to the second fast corner FF2, a yield for the system-on-chip may be substantially maintained. In some example embodiments, the system-on-chips in the first slow corner SS1 or in the first fast corner FF1 may be discarded as defective products. In other example embodiments, by reducing the increment of the slow corner and the decrement of the fast corner, the system-on-chips may have an improved yield. For example, in a case where the first slow corner SS1 may not be increased and the first fast corner FF1 may not be decreased, the system-on-chips may have the improved yield by applying the forward body biasing to the system-on-chips in first slow corner SS1 and by applying the reverse body biasing to the system-on-chips in first fast corner FF1.

Figure 2B:
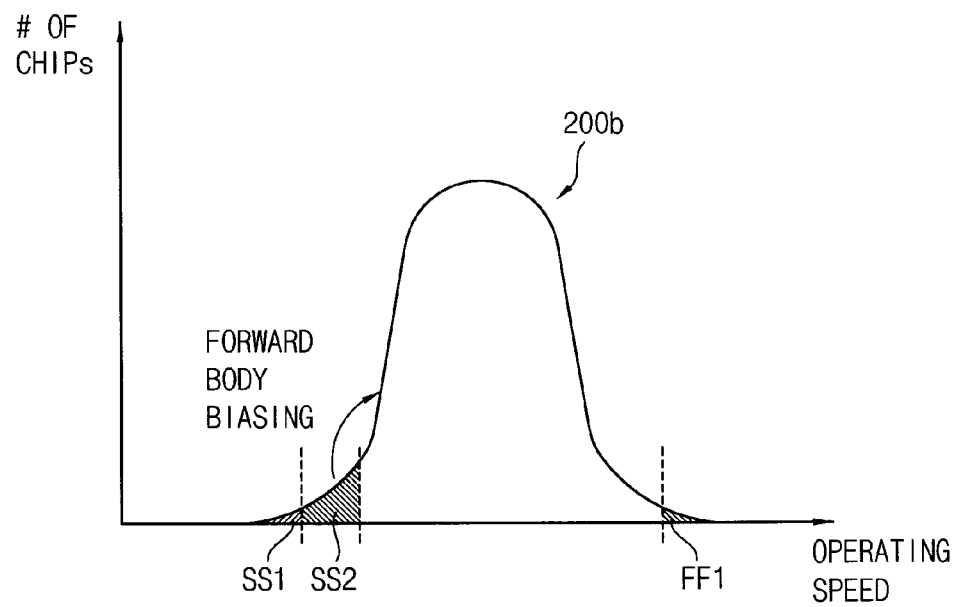
FIG. 2B is a diagram illustrating another example of a design window reduction performed by a design method according to example embodiments.

FIG. 2B is a diagram illustrating another example of a design window reduction performed by a design method according to example embodiments.

Referring to FIG. 2B, system-on-chips may have an operating speed distribution 200b due to a process variation. In a design method according to example embodiments, a first slow corner SS1 of the operating speed distribution 200b may be increased to a second slow corner SS2 faster than the first slow corner SS1 by reflecting forward body biasing that is to be applied to the system-on-chips.

At least one tapless standard cell included in each system-on-chip may be implemented and manufactured based on a slow corner timing parameter adjusted to correspond to the second slow corner SS2. For example, a slow corner cell delay of the tapless standard cell corresponding to an operating speed upper limit of the first slow corner SS1 may be adjusted to correspond to the an operating speed upper limit of the second slow corner SS2. The adjusted slow corner cell delay and a fast corner cell delay that is not adjusted may be applied during the synthesis, the placement and routing and/or the static timing analysis of the system-on-chip including the tapless standard cell. Accordingly, the system-on-chip having the improved operating speed may be implemented and manufactured by decreasing the slow corner cell delay.

Among the system-on-chips implemented and manufactured by the design method according to example embodiments, the forward body biasing may be applied to the system-on-chips in the second slow corner SS2. Accordingly, although the slow corner is increased from the first slow corner SS1 to the second slow corner SS2, a yield for the system-on-chip may be substantially maintained. In some example embodiments, the system-on-chips in the first slow corner SS1 or in the first fast corner FF1 may be discarded as defective products. In other example embodiments, by reducing the increment of the slow corner, the system-on-chips may have an improved yield.

Figure 2C:
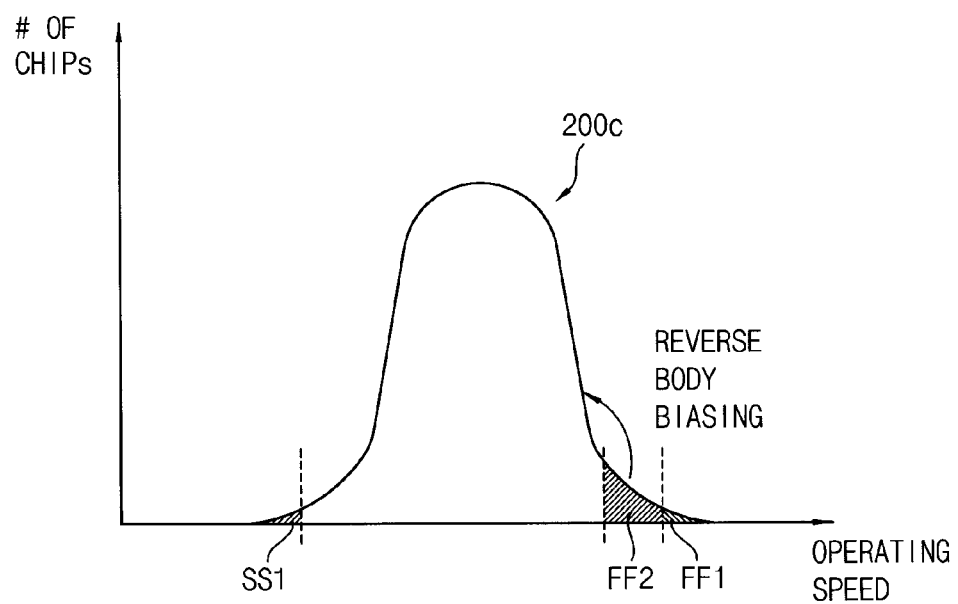
FIG. 2C is a diagram illustrating still another example of a design window reduction performed by a design method according to example embodiments.

FIG. 2C is a diagram illustrating still another example of a design window reduction performed by a design method according to example embodiments.

Referring to FIG. 2C, system-on-chips may have an operating speed distribution 200c due to a process variation. In a design method according to example embodiments, a first fast corner FF1 of the operating speed distribution 200c may be decreased to a second fast corner FF2 slower than the first fast corner FF1 by reflecting reverse body biasing that is to be applied to the system-on-chips.

At least one tapless standard cell included in each system-on-chip may be implemented and manufactured based on a fast corner timing parameter adjusted to correspond to the second fast corner FF2. For example, a fast corner cell delay of the tapless standard cell corresponding to an operating speed lower limit of the first fast corner FF1 may be adjusted to correspond to the an operating speed lower limit of the second fast corner FF2. The adjusted fast corner cell delay and a slow corner cell delay that is not adjusted may be applied during the synthesis, the placement and routing and/or the static timing analysis of the system-on-chip including the tapless standard cell. Accordingly, the system-on-chip having the reduced power consumption may be implemented and manufactured by increasing the fast corner cell delay.

Among the system-on-chips implemented and manufactured by the design method according to example embodiments, the reverse body biasing may be applied to the system-on-chips in the second fast corner FF2. Accordingly, although the fast corner is decreased from the first fast corner FF1 to the second fast corner FF2, a yield for the system-on-chip may be substantially maintained. In some example embodiments, the system-on-chips in the first slow corner SS1 or in the first fast corner FF1 may be discarded as defective products. In other example embodiments, by reducing the decrement of the fast corner, and thus the system-on-chips may have an improved yield.

Figure 3:
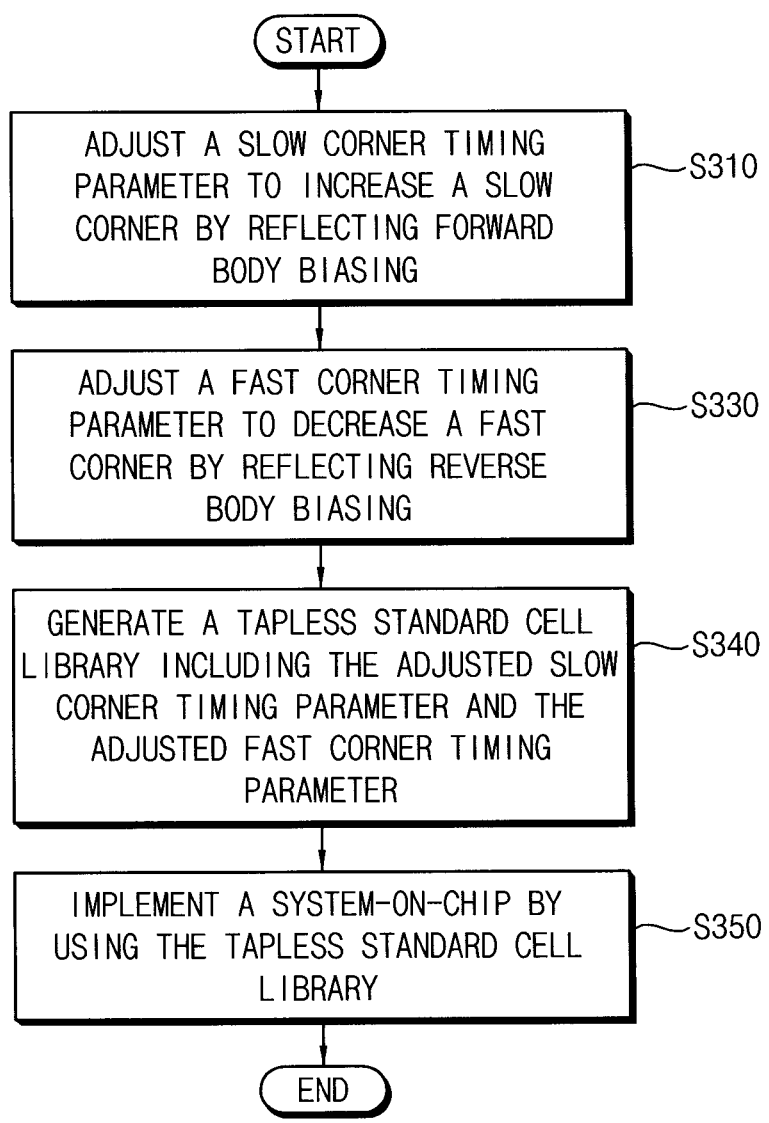
FIG. 3 is a flow chart illustrating a method of designing a system-on-chip including a tapless standard cell according to example embodiments.

FIG. 3 is a flow chart illustrating a method of designing a system-on-chip including a tapless standard cell according to example embodiments.

Referring to FIG. 3, a slow corner timing parameter of a tapless standard cell may be adjusted to increase a slow corner of an operating speed distribution for a system-on-chip including the tapless standard cell by reflecting forward body biasing (S310). For example, to increase the slow corner, a slow corner cell delay of the tapless standard cell may be decreased to correspond to the increased slow corner.

A fast corner timing parameter of the tapless standard cell may be adjusted to decrease a fast corner of the operating speed distribution for the system-on-chip including the tapless standard cell by reflecting reverse body biasing (S330). For example, to decrease the fast corner, a fast corner cell delay of the tapless standard cell may be increased to correspond to the decreased fast corner.

A tapless standard cell library including the adjusted slow corner timing parameter corresponding to the increased slow corner and the adjusted fast corner timing parameter corresponding to the decreased fast corner may be generated (S340). For example, in a case where the tapless standard cell is implemented as an inverter, a tapless standard cell library of the inverter may include a slow corner cell delay corresponding to the increased slow corner and a fast corner cell delay corresponding to the decreased fast corner. That is, the slow corner cell delay included in the tapless standard cell library may be increased from a conventional slow corner cell delay, and the fast corner cell delay included in the tapless standard cell library may be decreased from a conventional fast corner cell delay. In some example embodiments, the tapless standard cell library may include not only the adjusted timing parameters but also layout data, function definition, power information, noise information, etc. for the tapless standard cell.

The system-on-chip including the tapless standard cell may be implemented based on the adjusted slow corner timing parameter and the adjusted fast corner timing parameter included in the tapless standard cell library (S350). For example, a gate level netlist may be generated by synthesizing a register-transfer level netlist for the system-on-chip based on the tapless standard cell library, components of the system-on-chip may be placed and routed based on the tapless standard cell library and the gate level netlist, and a timing of the system-on-chip where the components are placed and routed may be verified based on the adjusted slow corner timing parameter and the adjusted fast corner timing parameter included in the tapless standard cell library. That is, by applying the adjusted timing parameters included in the tapless standard cell library during the synthesis, the placement and routing and/or the static timing analysis of the system-on-chip, the system-on-chip including the tapless standard cell may be implemented corresponding to the adjusted timing parameters.

Although FIG. 3 illustrates an example where a design window reduction is performed by increasing the slow corner and by decreasing the fast corner, in some example embodiments, the design window reduction may be performed by one of increasing the slow corner and decreasing the fast corner.

Hereinafter, an example of the step (S350) of implementing the system-on-chip will be described below with reference to FIGS. 3, 4 and 5.

Figure 4:
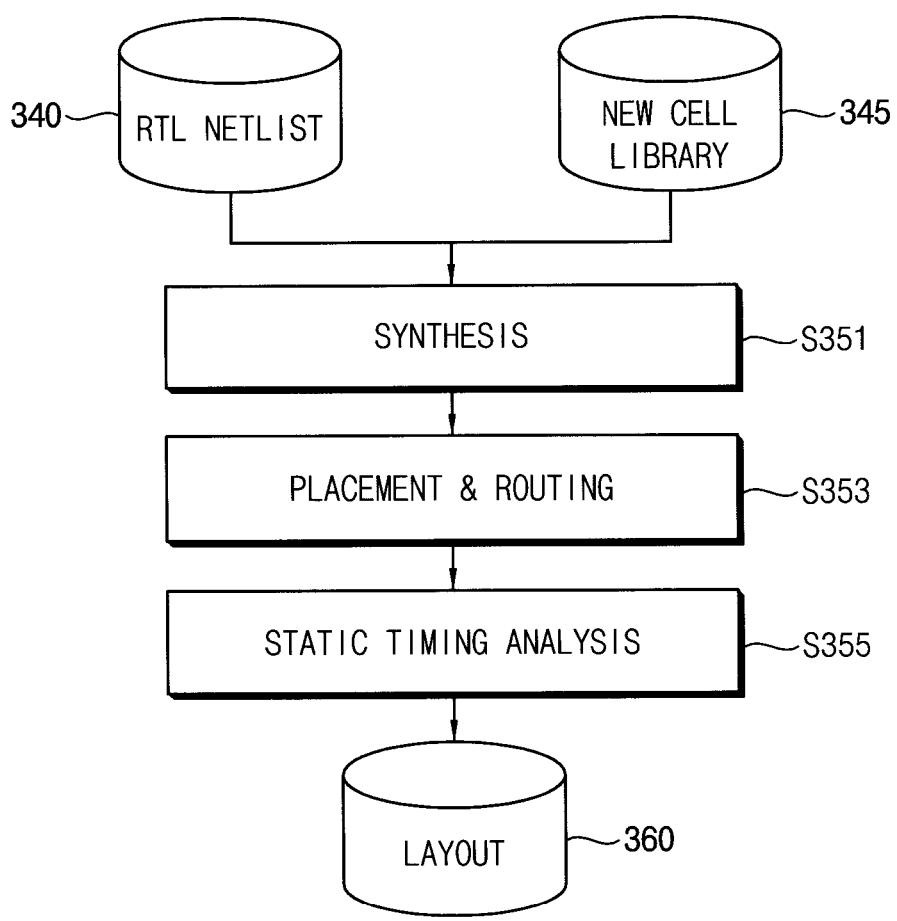
FIG. 4 is a flow chart illustrating an example of a step of implementing a system-on-chip in a design method according to example embodiments.

FIG. 4 is a flow chart illustrating an example of a step of implementing a system-on-chip in a design method according to example embodiments, and FIG. 5 is a diagram for describing an example of a tapless standard cell library including a timing parameter adjusted according to a design window reduction.

Referring to FIGS. 3, 4 and 5, a slow corner timing parameter of a tapless standard cell may be adjusted to increase a slow corner of an operating speed distribution for a systemon-chip including the tapless standard cell by reflecting forward body biasing (S310). A fast corner timing parameter of the tapless standard cell may be adjusted to decrease a fast corner of the operating speed distribution for the system-on-chip including the tapless standard cell by reflecting reverse body biasing (S330).

A tapless standard cell library including the adjusted slow corner timing parameter corresponding to the increased slow corner and the adjusted fast corner timing parameter corresponding to the decreased fast corner may be generated (S340). In FIG. 5, a tapless standard cell library 345a for an inverter is illustrated as an example of a tapless standard cell library 345. The tapless standard cell library 345a for the inverter illustrated in FIG. 5 may include a table 347a for setting values of cell delays D1, D2, D3, D4, D5, D6, D7, D8, D9, D10, D11 and D12 respectively corresponding to combinations of a plurality of input slews IS1, IS2 and IS3 and a plurality of output loads OL1, OL2 and OL3. In a case where the tapless standard cell library 345a for the inverter is a tapless standard cell library for a slow corner, the cell delays D1, D2, D3, D4, D5, D6, D7, D8, D9, D10, D11 and D12 (i.e., slow corner cell delays) included in the tapless standard cell library 345a may be decreased from conventional slow corner cell delays. Further, in a case where the tapless standard cell library 345a for the inverter is a tapless standard cell library for a fast corner, the cell delays D1, D2, D3, D4, D5, D6, D7, D8, D9, D10, D11 and D12 (i.e., fast corner cell delays) included in the tapless standard cell library 345a may be increased from conventional fast corner cell delays.

To implement the system-on-chip (S350), a gate level netlist for the system-on-chip may be generated by synthesizing a RTL netlist 340 for the system-on-chip based on the tapless standard cell library 345 including the adjusted slow corner timing parameter and the adjusted fast corner timing parameter (S351). In some example embodiments, the tapless standard cell library 345 may include not only the adjusted timing parameters but also layout data, function definition, power information, noise information, etc. for the tapless standard cell. Further, the tapless standard cell library 345 may be provided for each corner of respective types of tapless standard cells included in the system-on-chip. For example, the tapless standard cell may be implemented as an inverter, a NAND gate, an AND gate, a NOR gate, an OR gate, a XOR gate, a XNOR gate, a multiplexer, an adder, a latch, a flip-flop, etc., and tapless standard cell libraries 345 for slow corners and fast corners of the inverter, the NAND gate, the AND gate, the NOR gate, the OR gate, the XOR gate, the XNOR gate, the multiplexer, the adder, the latch and the flip-flop may be provided. At least one of the tapless standard cell library 345 for the slow corner and the tapless standard cell library 345 for the fast corner of each type of the tapless standard cell may have a timing parameter adjusted according to a design window reduction. According to example embodiments, the RTL netlist 340 may include a bias voltage generator for generating a bias voltage, or an additional netlist for the bias voltage generator may be synthesized with the RTL netlist 340. For example, the netlist 340 may define a bias voltage generator that is configured to apply a forward body bias voltage or a reverse body bias voltage to the tapless standard cell, such that the operating speed of the tapless standard cell falls within the design window selected by an operator of the system-on-chip design process.

After the gate level netlist for the system-on-chip is generated, layout data 360 for the system-on-chip may be generated by placing and routing components of the system-on-chip based on the tapless standard cell library 345 and the gate level netlist (S353). Compared to a size and/or a wiring length of each component placed and routed based on a timing parameter that is not adjusted, a size and/or a wiring length of each component placed and routed based on an adjusted timing parameter (e.g., the adjusted slow corner timing parameter and the adjusted fast corner timing parameter) may be reduced. For example, if the slow corner is increased, the tapless standard cell library 345 of the inverter for the slow corner may include a reduced cell delay. In this case, since the maximum cell delay for the inverter is reduced, the inverter may have a small size and a short wiring length regardless of a decrease of the fast corner. That is, since the system-on-chip is placed and routed based on the adjusted slow corner timing parameter corresponding to the increase slow corner and the adjusted timing parameter corresponding to the decreased fast corner, the system-on-chip may have the small size and the short wiring length.

After the layout data 360 for the system-on-chip is generated, a timing of the layout data 360 for the system-on-chip may be verified based on the adjusted timing parameters included in the tapless standard cell library 345 (S355). For example, a signal transfer timing, a hold time violation, a setup time violation, etc. of each path of the system-on-chip according to the layout data 360 may be checked. If a timing violation is detected during the timing verification, a netlist and/or wring for the system-on-chip may be modified.

The system-on-chip may be manufactured and packaged based on the layout data 360 where the timing verification is completed. In a case where the manufactured and packed system-on-chip is in the increased slow corner or in the decreased fast corner, body biasing may be applied to the system-on-chip. Accordingly, although increasing the slow corner and/or decreasing the fast corner are performed, or although a design window reduction is performed, a yield for the system-on-chip may be substantially maintained. Further, since the system-on-chip is implemented based on the timing parameters adjusted according to the design window reduction, an operating speed of the system-on-chip may be improved, and power consumption and a size of the system-on-chip may be reduced.

Figure 6:
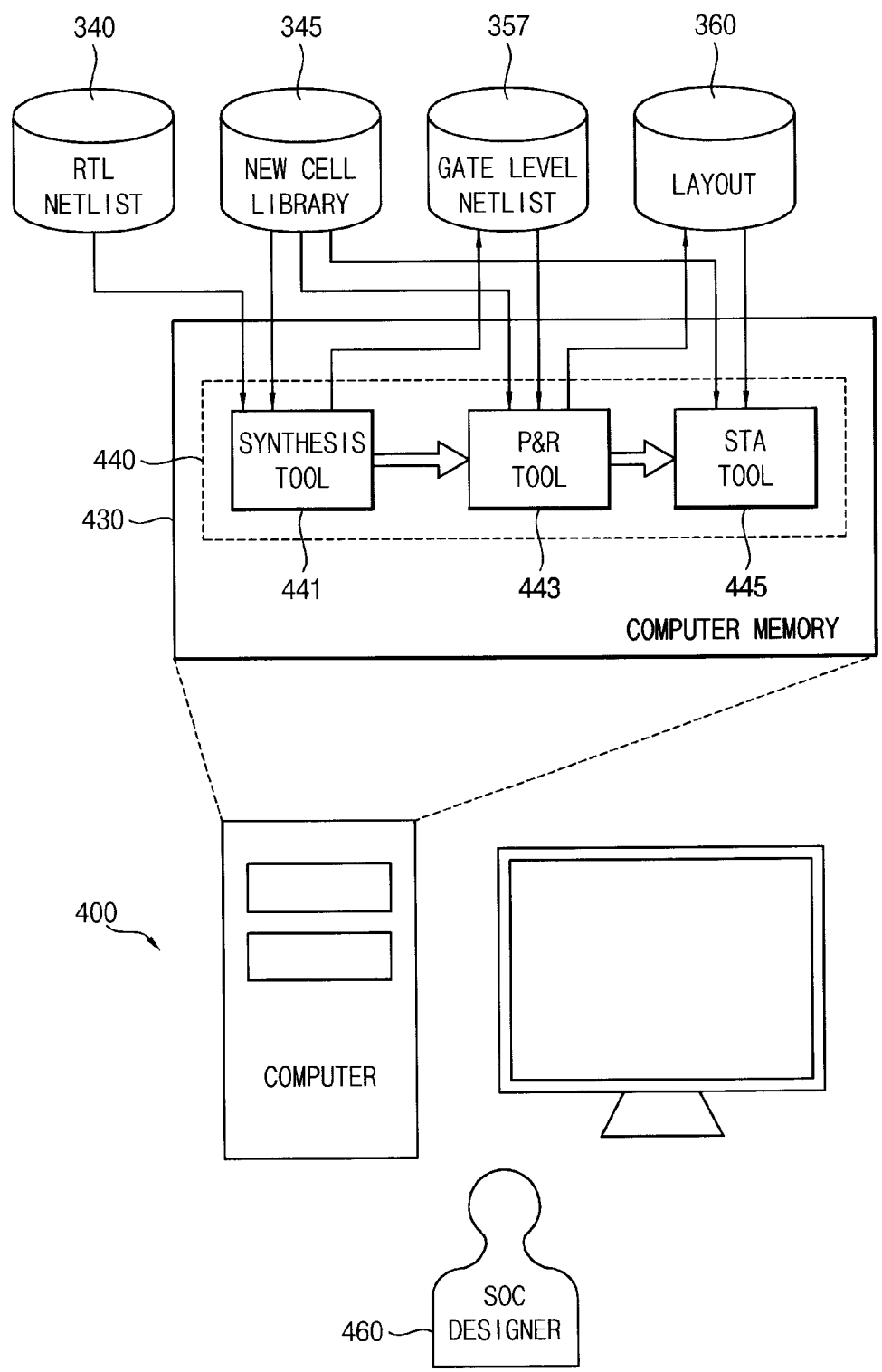
FIG. 6 is a diagram illustrating a designing system for designing a system-on-chip including a tapless standard cell according to example embodiments.

FIG. 6 is a diagram illustrating a designing system for designing a system-on-chip including a tapless standard cell according to example embodiments.

Referring to FIG. 6, a designing system 400 may include a memory device 430 in which a design tool for designing a system-on-chip including a tapless standard cell is loaded, and a processor that executes the design tool loaded in the memory device 430. The designing system 400 may perform the design method illustrated in FIGS. 3 and 4.

The processor may load the design tool 440, such as an electronic design automation (EDA) tool, into the memory device 430. For example, the processor may load the design tool 440 from a storage device, such as a solid state drive, a hard disk drive, a CD-ROM, etc., into the memory device 430.

The processor may execute the design tool 440 to implement the system-on-chip. The design tool 440 executed by the processor may implement the system-on-chip including the tapless standard cell based on an RTL netlist 340 for the system-on-chip and a tapless standard cell library 345 including a slow corner timing parameter that is adjusted to correspond to an increased slow corner by reflecting forward body biasing and a fast corner timing parameter that is adjusted to correspond to a decreased fast corner by reflecting reverse body biasing. For example, the processor may execute a synthesis tool 441, a placement and routing tool 443 and a static timing analysis tool 445.

The synthesis tool 441 executed by the processor may generate a gate level netlist 357 for the system-on-chip by synthesizing the RTL netlist 340 based on the tapless standard cell library 345. The placement and routing tool 443 may generate layout data 360 for the system-on-chip by placing and routing components of the system-on-chip based on the tapless standard cell library 345 and the gate level netlist 357. The static timing analysis tool 445 may verify a timing of the layout data 360 for the system-on-chip based on the adjusted timing parameters included in the tapless standard cell library 345. While implementing the system-on-chip, the designing system 400 may provide a system-on-chip (SOC) designer 460 with a result of each process via an output device, such as a display device, and may receive feedback from the SOC designer 460 via an input device, such as a keyboard.

The system-on-chip may be manufactured and packaged based on the layout data 360 where the timing verification is completed. Examples of the manufactured system-on-chips are illustrated in FIGS. 7A through 10.

Figure 7A:
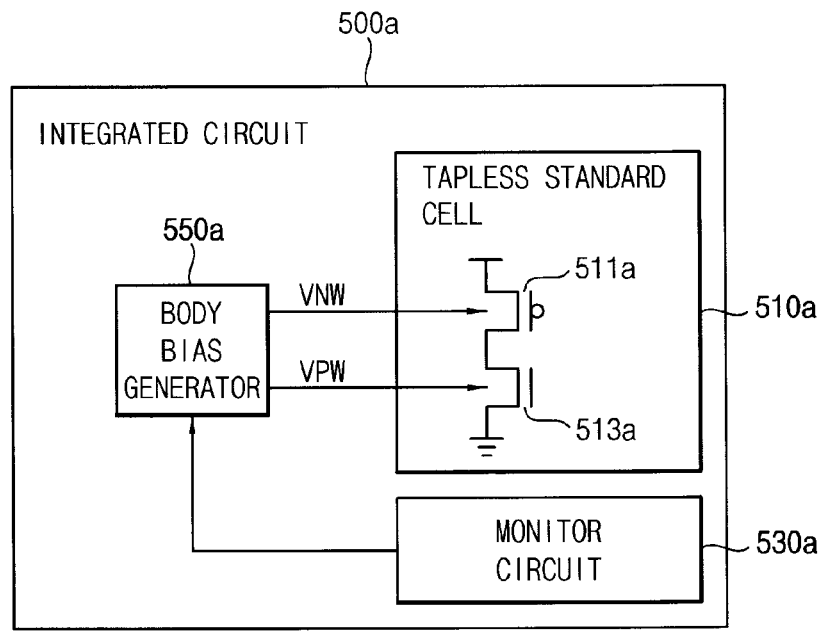
FIG. 7A is a block diagram illustrating an example of a system-on-chip including a tapless standard cell according to example embodiments.

FIG. 7A is a block diagram illustrating an example of a system-on-chip including a tapless standard cell according to example embodiments.

Referring to FIG. 7A, a system-on-chip may be implemented and manufactured as an integrated circuit 500a including at least one tapless standard cell 510a, a monitor circuit 530a and a body bias generator 550a. The system-on-chip may be any system-on-chip that is designed in a semi-custom methodology based on a standard cell. For example, the system-on-chip may be a mobile SOC, an application processor, a media processor, a microprocessor, a central processing unit (CPU), etc.

The tapless standard cell 510a may be implemented as various types of circuits. For example, the tapless standard cell 510a may be implemented as an inverter, a NAND gate, an AND gate, a NOR gate, an OR gate, a XOR gate, a XNOR gate, a multiplexer, an adder, a latch, a flip-flop, etc. At least one transistor included in the tapless standard cell 510a may not have a tap that couples a body of the transistor to a power supply voltage line or a ground voltage line. That is, the body of the transistor may not be coupled to the power supply voltage line or the ground voltage line, and a body bias voltage may be applied to the body of the transistor. The tapless standard cell 510a may include at least one PMOS transistor 511a and at least one NMOS transistor 513a.

The monitor circuit 530a may measure an operating speed of the integrated circuit 500a including the tapless standard cell 510a. For example, the monitor circuit 530a may include a ring oscillator, and may measure the operating speed of the integrated circuit 500a based on an output frequency of the ring oscillator. In other examples, the monitor circuit 530a may measure the operating speed of the integrated circuit 500a by measuring a leakage current of the integrated circuit 500a. The monitor circuit 530a may decide that the operating speed of the integrated circuit 500a is fast when the leakage current of the integrated circuit 500a is large. The monitor circuit 530a may perform the measurement of the operating speed during an initialization sequence of the system-on-chip, and may provide information about the measured operating speed to the body bias generator 550a.

The body bias generator 550a may selectively apply a body bias voltage VNW and VPW to the tapless standard cell 510a based on the information about the operating speed of the integrated circuit 500a. For example, The body bias generator 550a may apply a forward body bias voltage to the tapless standard cell 510a in a case where the integrated circuit 500a is in an increased slow corner (e.g., a second slow corner SS2 illustrated in FIG. 2A), may apply a reverse body bias voltage to the tapless standard cell 510a in a case where the integrated circuit 500a is in a decreased fast corner (e.g., a second fast corner FF2 illustrated in FIG. 2A), and may not apply the body bias voltage to the tapless standard cell 510a in a case where the integrated circuit 500a is neither in the increased slow corner nor in the decreased fast corner.

If the integrated circuit 500a is in the increased slow corner, the body bias generator 550a may apply a PMOS body bias voltage (or an N-well voltage) VNW lower than a power supply voltage as the forward body bias voltage to a body of the PMOS transistor 511a included in the tapless standard cell 510a, and may apply an NMOS body bias voltage (or a P-well voltage) VPW higher than a ground voltage as the forward body bias voltage to a body of the NMOS transistor 513a included in the tapless standard cell 510a. For example, in a case where the power supply voltage is about 1.0 V, the PMOS body bias voltage VNW may be lower than about 1.0 V and higher than about 0.5 V, and the NMOS body bias voltage VPW may be higher than about 0.0 V and lower than about 0.5 V. If the PMOS body bias voltage VNW lower than the power supply voltage is applied to the body of the PMOS transistor 511a and the NMOS body bias voltage VPW higher than the ground voltage is applied to the body of the NMOS transistor 513a, threshold voltages of the PMOS and NMOS transistors 511a and 513a may decrease, and thus the operating speed of the tapless standard cell 510a may increase. Accordingly, the operating speed of the integrated circuit 500a in the increased slow corner may increase, and the minimum operating speed of manufactured system-on-chips may increase.

If the integrated circuit 500a is in the decreased fast corner, the body bias generator 550a may apply a PMOS body bias voltage VNW higher than a power supply voltage as the reverse body bias voltage to the body of the PMOS transistor 511a included in the tapless standard cell 510a, and may apply an NMOS body bias voltage VPW lower than the ground voltage as the reverse body bias voltage to the body of the NMOS transistor 513a included in the tapless standard cell 510a. For example, in a case where the power supply voltage is about 1.0 V, the PMOS body bias voltage VNW may be higher than about 1.0 V and lower than about 1.4 V, and the NMOS body bias voltage VPW may be lower than about 0.0 V and higher than about −0.4 V. Accordingly, the operating speed of the integrated circuit 500a in the decreased fast corner may decrease, and the maximum operating speed of the manufactured system-on-chips may decrease.

The tapless standard cell 510a may be implemented based on a timing parameter that is adjusted according to a design window reduction (i.e., a reduction of a gap between a slow corner and a fast corner of an operating speed distribution) by reflecting body biasing. Accordingly, the minimum operating speed of the system-on-chip including the tapless standard cell 510a may be increased, and the maximum power consumption and the maximum size of the system-on-chip may be decreased. Further, although the design window is reduced, a yield for the system-on-chip may be substantially maintained by applying forward body biasing to the system-on-chip in the increased slow corner and reverse body biasing to the system-on-chip in the decreased fast corner.

Figure 7B:
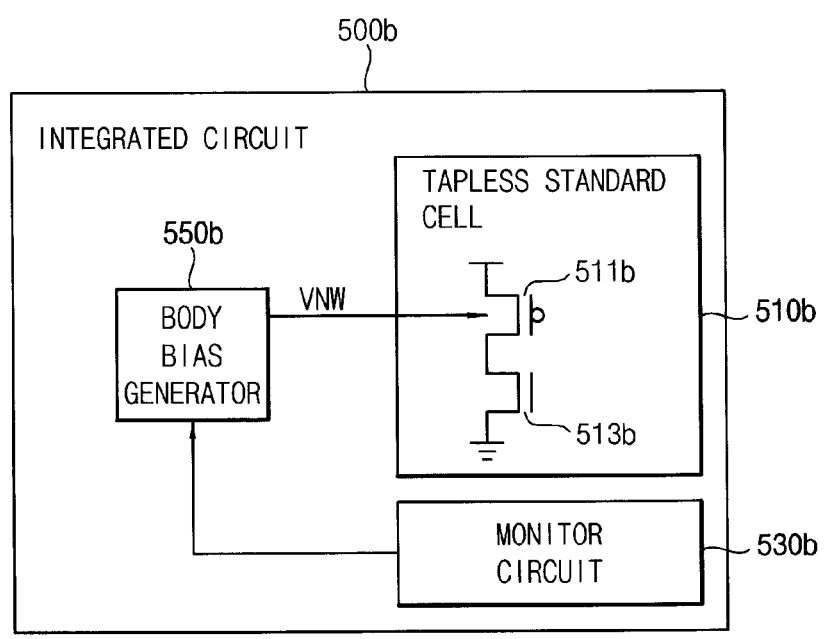
FIG. 7B is a block diagram illustrating another example of a system-on-chip including a tapless standard cell according to example embodiments.

FIG. 7B is a block diagram illustrating another example of a system-on-chip including a tapless standard cell according to example embodiments.

Referring to FIG. 7B, a system-on-chip may be implemented and manufactured as an integrated circuit 500b including at least one tapless standard cell 510b, a monitor circuit 530b and a body bias generator 550b. The tapless standard cell 510b may include at least one PMOS transistor 511b and at least one NMOS transistor 513b. The system-on-chip of FIG. 7B may have a similar configuration to a systemon-chip of FIG. 7A, except that the body bias generator 550*b* may apply a body bias voltage VNW only to the PMOS transistor 511*b*.

The body bias generator 550*b* may apply a forward body bias voltage to the PMOS transistor 511*b* in a case where the system-on-chip is in an increased slow corner, and may apply a reverse body bias voltage to the NMOS transistor 513*b* in a case where the system-on-chip is in a decreased fast corner.

Figure 7C:
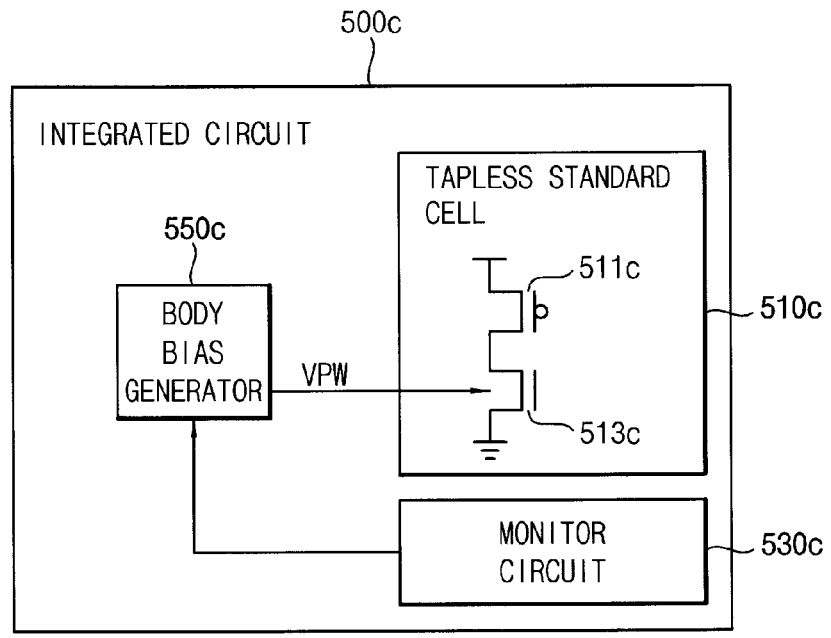
FIG. 7C is a block diagram illustrating still another example of a system-on-chip including a tapless standard cell according to example embodiments.

FIG. 7C is a block diagram illustrating still another example of a system-on-chip including a tapless standard cell according to example embodiments.

Referring to FIG. 7C, a system-on-chip may be implemented and manufactured as an integrated circuit 500*c* including at least one tapless standard cell 510*c*, a monitor circuit 530*c* and a body bias generator 550*c*. The tapless standard cell 510*c* may include at least one PMOS transistor 511*c* and at least one NMOS transistor 513*c*. The system-on-chip of FIG. 7C may have a similar configuration to a system-on-chip of FIG. 7A, except that the body bias generator 550*c* may apply a body bias voltage VPW only to the NMOS transistor 513*c*.

The body bias generator 550*c* may apply a forward body bias voltage to the NMOS transistor 511*c* in a case where the system-on-chip is in an increased slow corner, and may apply a reverse body bias voltage to the PMOS transistor 513*c* in a case where the system-on-chip is in a decreased fast corner.

Figure 8:
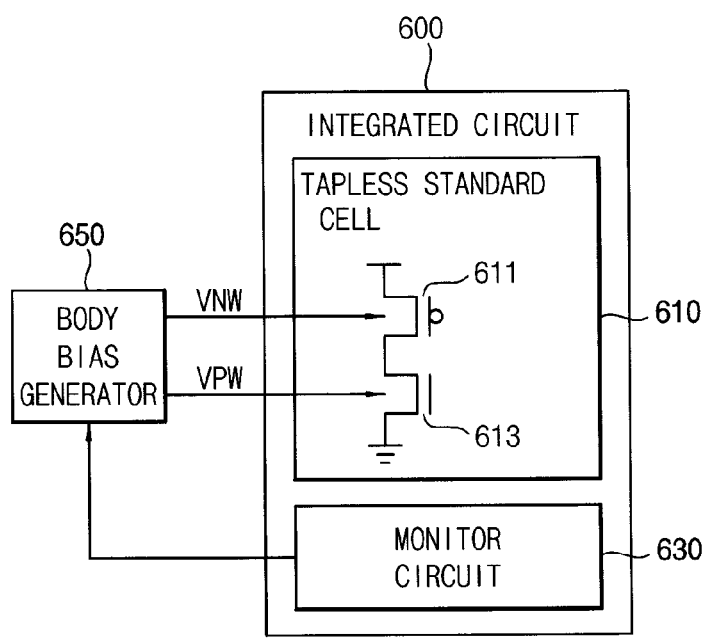
FIG. 8 is a block diagram illustrating a system-on-chip including a tapless standard cell according to example embodiments.

FIG. 8 is a block diagram illustrating a system-on-chip including a tapless standard cell according to example embodiments.

Referring to FIG. 8, a system-on-chip may include an integrated circuit 600 including at least one tapless standard cell 610 and a monitor circuit 630, and a body bias generator 650 located outside the integrated circuit 600. The tapless standard cell 610 may include at least one PMOS transistor 611 and at least one NMOS transistor 613. The system-on-chip of FIG. 8 may have a similar configuration to a system-on-chip of FIG. 7A, except that the body bias generator 650 may be located outside the integrated circuit 600.

The body bias generator 650 may apply a forward body bias voltage to the tapless standard cell 610 in a case where the system-on-chip is in an increased slow corner, and may apply a reverse body bias voltage to the tapless standard cell 610 in a case where the system-on-chip is in a decreased fast corner. According to example embodiments, the body bias generator 650 may apply the body bias voltage VNW and VPW to the PMOS transistor 611, the NMOS transistor 613 or both of the PMOS and NMOS transistors 611 and 613. If the body bias generator 650 is located outside the integrated circuit 600, a size of the integrated circuit 600 may decrease although the number of pins of the integrated circuit 600 increases.

FIGS. 7A through 8 illustrate examples of system-on-chips including monitor circuits. In these system-on-chips, the monitor circuit may measure the operating speed of the system-on-chip during an initialization sequence (or a boot sequence) of the system-on-chip to determine whether body biasing is to be applied or not. In other example embodiments, as illustrated in FIG. 9, whether the body biasing is to be applied may be determined by a chip test after the system-on-chip is manufactured.

Figure 9:
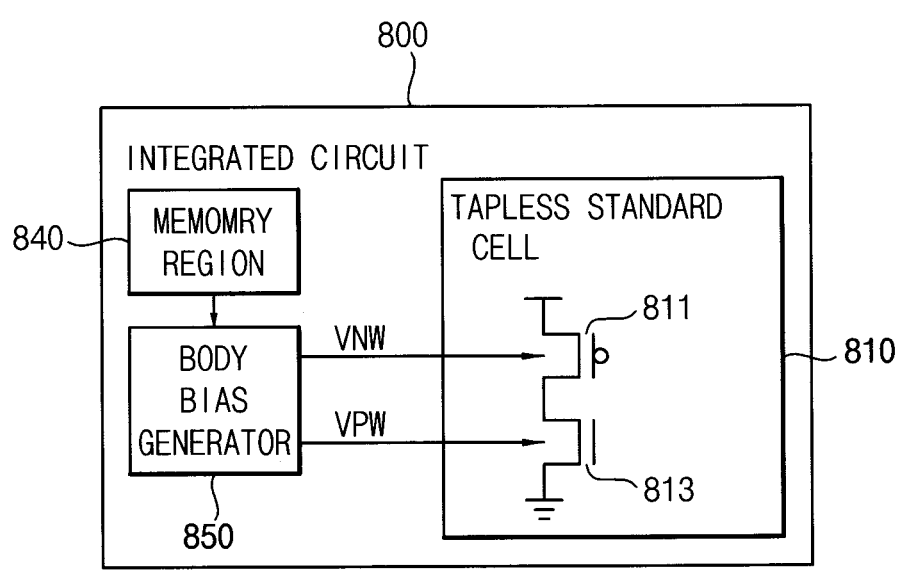
FIG. 9 is a block diagram illustrating a system-on-chip including a tapless standard cell according to example embodiments.

FIG. 9 is a block diagram illustrating a system-on-chip including a tapless standard cell according to example embodiments.

Referring to FIG. 9, a system-on-chip may be implemented and manufactured as an integrated circuit 800 including at least one tapless standard cell 810, a memory region 840 and a body bias generator 850. The system-on-chip may be any system-on-chip that is designed in a semi-custom methodology based on a standard cell.

The tapless standard cell 810 may be implemented based on a timing parameter that is adjusted according to a design window reduction (e.g., an increase of a slow corner and/or a decrease of a fast corner of an operating speed distribution) by reflecting body biasing. That is, the slow corner and/or the fast corner may be newly set when designing the tapless standard cell 810. For example, the system-on-chip including the tapless standard cell 810 may be designed such that the slow corner is increased and the fast corner is decreased.

After the system-on-chip is manufactured, a test (e.g., a wafer-level test, a chip-level test, a package-level test, etc.) may be performed to check whether the system-on-chip is in the increased slow corner or in the decreased fast corner. For example, whether the system-on-chip is in the increased slow corner or in the decreased fast corner may be determined by measuring an operating speed of the system-on-chip. A result of the test may be written to the memory region 840. For example, body bias information representing whether the system-on-chip is in the increased slow corner, in the decreased fast corner or in a reduced design window between the increased slow corner and the decreased fast corner may be written to the memory region 840. If the operating speed of the system-on-chip may be slower than an operating speed lower limit of the increased slow corner or faster than an operating speed upper limit of the decreased fast corner, the system-on-chip may be discarded as a defective product.

The memory region 840 may store the body bias information representing whether the system-on-chip is in the increased slow corner, in the decreased fast corner or in the reduced design window. In some example embodiments, the memory region 840 may be implemented with a nonvolatile memory device. For example, the memory region 840 may be implemented with an electrically programmable fuse memory, a laser-programmable fuse memory, an anti-fuse memory, an one-time programmable (OTP) memory, a flash memory, a mask read-only memory (ROM), a programmable read-only memory (PROM), an erasable programmable read-only memory (EPROM), an electrically erasable programmable memory (EEPROM), etc. In other example embodiments, the memory region 840 may be implemented with a register or a volatile memory device, and the body bias information may be provided from an external device to the memory region 840 during an initialization sequence of the system-on-chip.

The body bias generator 850 may selectively apply a body bias voltage VNW and VPW to the tapless standard cell 810 based on the body bias information stored in the memory region 840. For example, in a case where the body bias information indicates that the system-on-chip is in the increased slow corner, the body bias generator 850 may apply a forward body bias voltage to the tapless standard cell 810. In a case where the body bias information indicates that the system-on-chip is in the decreased fast corner, the body bias generator 850 may apply a reverse body bias voltage to the tapless standard cell 810. According to example embodiments, the body bias generator 850 may apply the body bias voltage VNW and VPW to the PMOS transistor 811, the NMOS transistor 813 or both of the PMOS and NMOS transistors 811 and 813. According to example embodiments, the body bias generator 850 may be located inside or outside the integrated circuit 800.

Figure 10:
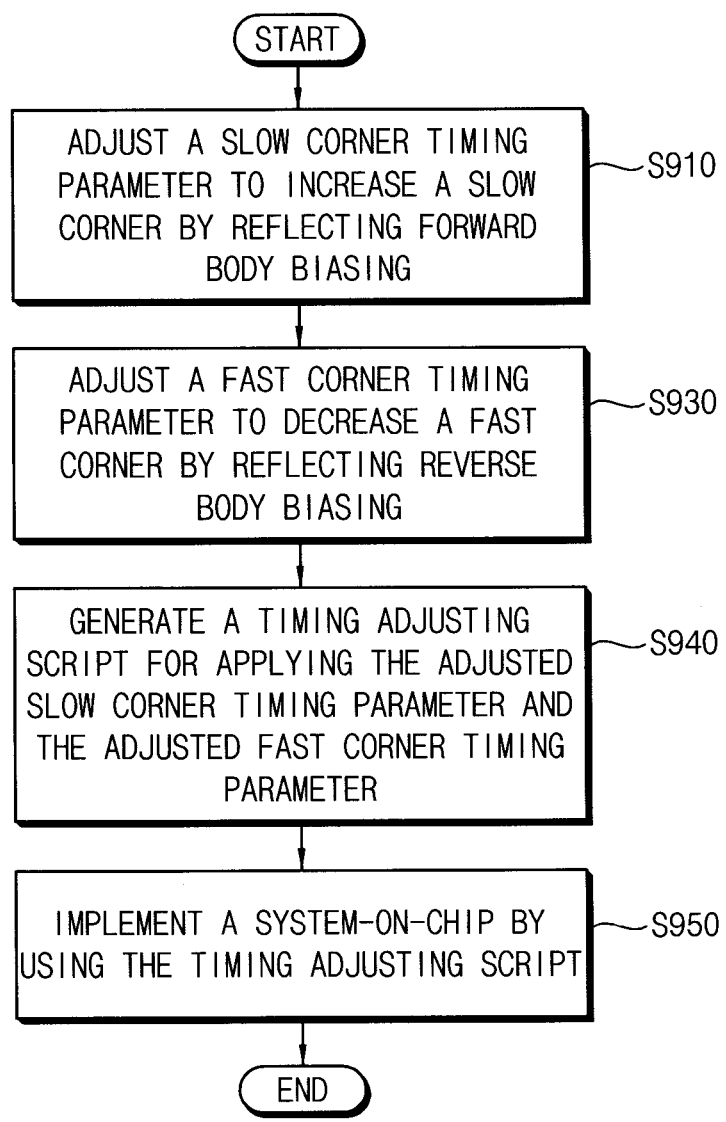
FIG. 10 is a flow chart illustrating a method of designing a system-on-chip including a tapless standard cell according to example embodiments.

FIG. 10 is a flow chart illustrating a method of designing a system-on-chip including a tapless standard cell according to example embodiments.

Referring to FIG. 10, a slow corner timing parameter of a tapless standard cell may be adjusted to increase a slow corner of an operating speed distribution for a system-on-chip including the tapless standard cell by reflecting forward body biasing (S910). For example, to increase the slow corner, a slow corner cell delay of the tapless standard cell may be decreased to correspond to the increased slow corner.

A fast corner timing parameter of the tapless standard cell may be adjusted to decrease a fast corner of the operating speed distribution for the system-on-chip including the tapless standard cell by reflecting reverse body biasing (S930). For example, to decrease the fast corner, a fast corner cell delay of the tapless standard cell may be increased to correspond to the decreased fast corner.

A timing adjusting script for applying the adjusted slow corner timing parameter corresponding to the increased slow corner and the adjusted fast corner timing parameter corresponding to the decreased fast corner may be generated (S940). For example, in a case where the tapless standard cell is implemented as an inverter, the timing adjusting script may include a command line that decreases a slow corner cell delay of the inverter, and/or a command line that increases a fast corner cell delay of the inverter.

The system-on-chip including the tapless standard cell may be implemented based on the adjusted timing parameters by applying the timing adjusting script (S950). For example, a gate level netlist may be generated by synthesizing a register-transfer level netlist for the system-on-chip, the adjusted timing parameters may be applied to the gate level netlist in response to the timing adjusting script, components of the system-on-chip may be placed and routed based on the gate level netlist to which the adjusted timing parameters are applied, and a timing of the system-on-chip may be verified based on the adjusted timing parameters. That is, by applying the timing adjusting script that adjusts the slow corner timing parameter to correspond to the increased slow corner and the fast corner timing parameter to correspond to the decreased fast corner during the synthesis, the placement and routing and/or the static timing analysis of the system-on-chip, the system-on-chip including the tapless standard cell may be implemented corresponding to the adjusted timing parameters.

Hereinafter, an example of the step (S950) of implementing the system-on-chip will be described below with reference to FIGS. 10, 11 and 12.

Figure 11:
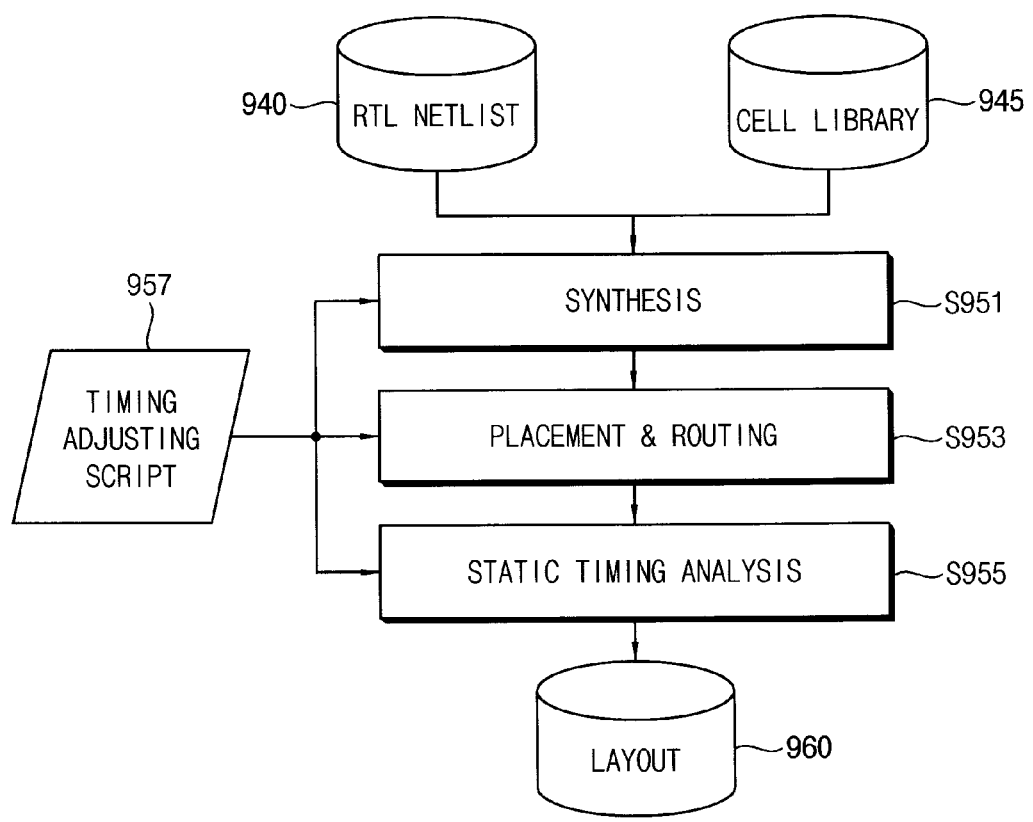
FIG. 11 is a flow chart illustrating an example of a step of implementing a system-on-chip in a design method according to example embodiments.

FIG. 11 is a flow chart illustrating an example of a step of implementing a system-on-chip in a design method according to example embodiments, and FIG. 12 is a diagram for describing an example of a timing adjusting script for applying a timing parameter adjusted according to a design window reduction.

Referring to FIGS. 10, 11 and 12, a slow corner timing parameter of a tapless standard cell may be adjusted to increase a slow corner of an operating speed distribution for a system-on-chip including the tapless standard cell by reflecting forward body biasing (S910). A fast corner timing parameter of the tapless standard cell may be adjusted to decrease a fast corner of the operating speed distribution for the system-on-chip including the tapless standard cell by reflecting reverse body biasing (S930).

A timing adjusting script 957 for applying the adjusted slow corner timing parameter corresponding to the increased slow corner and the adjusted fast corner timing parameter corresponding to the decreased fast corner may be generated (S940). FIG. 12 illustrates an example of the timing adjusting script 970 including first through fourth command lines 971, 973, 975 and 977. For example, the first command line 971 may set a cell delay of a tapless standard cell including a regular voltage threshold (RVT) transistor, the second command line 973 may set a cell delay of a tapless standard cell including a low voltage threshold (LVT) transistor, the third command line 975 may set a hold margin of a flip-flop including the RVT transistor, and the fourth command line may set a hold margin of a flip-flop including the LVT transistor.

To implement the system-on-chip (S950), a gate level netlist for the system-on-chip may be generated by synthesizing a RTL netlist 940 for the system-on-chip based on a tapless standard cell library 945 (S951). Unlike a tapless standard cell library 345 illustrated in FIG. 6, the tapless standard cell library 945 may include timing parameters corresponding to a conventional slow corner and a conventional fast corner. The timing parameters included in the tapless standard cell library 945 may be adjusted to correspond to the increased slow corner and the decreased fast corner by the timing adjusting script 957. In some example embodiments, the timing adjusting script 957 that adjust the timing parameters may be applied during the synthesis. According to example embodiments, a bias voltage generator for generate a body bias voltage may be included in the RTL netlist 940, or an additional netlist for the bias voltage generator may be synthesized along with the RTL netlist 940.

After the gate level netlist for the system-on-chip is generated, the adjusted timing parameters may be applied to the gate level netlist in response to the timing adjusting script 957, and layout data 960 for the system-on-chip may be generated by placing and routing components of the system-on-chip based on the gate level netlist to which the adjusted timing parameters are applied (S953). Sizes and/or wiring lengths of components placed and routed based on the adjusted timing parameters corresponding to the increased slow corner and the decreased fast corner may be reduced compared to sizes and/or wiring lengths of components placed and routed based on timing parameters corresponding to the conventional slow corner and the conventional fast corner.

After the layout data 960 for the system-on-chip are generated, a timing of the layout data 960 for the system-on-chip may be verified based on the adjusted timing parameters applied in response to the timing adjusting script 957 (S955). For example, a signal transfer timing, a hold time violation, a setup time violation, etc. of each path of the system-on-chip according to the layout data 960 may be checked.

The system-on-chip may be manufactured and packaged based on the layout data 960 of which the timing verification is completed. If the manufactured and packaged system-on-chip is in the increased slow corner or in the decreased fast corner, body biasing may be applied to the system-on-chip. Accordingly, although the increase of the slow corner and/or the decrease of the fast corner are performed, or although the design window reduction is performed, a yield for the system-on-chip may be substantially maintained. Further, since the system-on-chip is implemented based on the timing parameters adjusted according to the design window reduction, the operating speed of the system-on-chip may be improved, and the power consumption and the size of the system-on-chip may be reduced.

Figure 13:
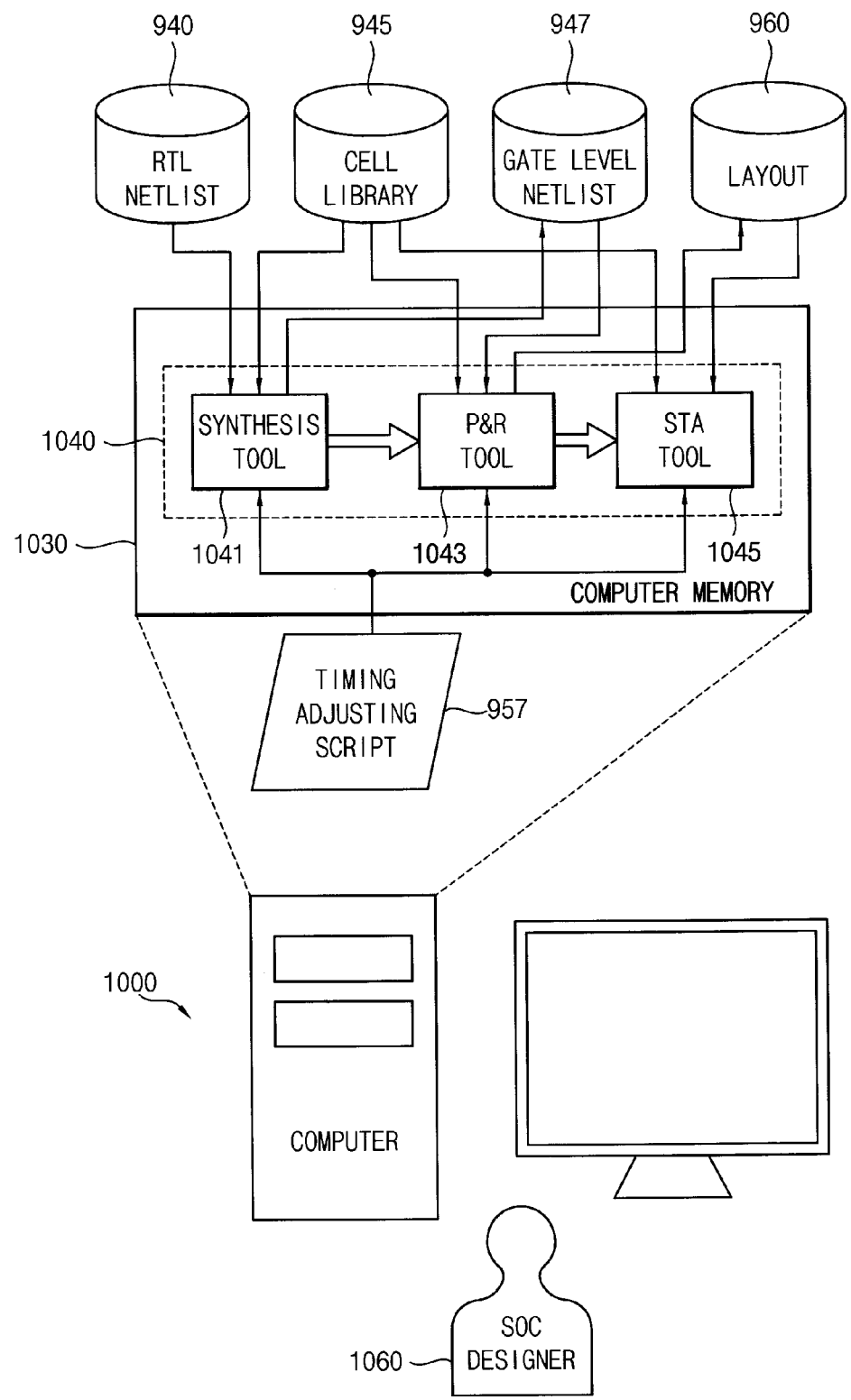
FIG. 13 is a diagram illustrating a designing system for designing a system-on-chip including a tapless standard cell according to example embodiments.

FIG. 13 is a diagram illustrating a designing system for designing a system-on-chip including a tapless standard cell according to example embodiments.

Referring to FIG. 13, a designing system 1000 may include a memory device 1030 in which a design tool for designing a system-on-chip including a tapless standard cell is loaded, and a processor that executes the design tool loaded in the memory device 1030. The designing system 1000 may perform the design method illustrated in FIGS. 11 and 12.

The processor may load the design tool 1040, such as an EDA tool, into the memory device 1030. For example, the processor may load the design tool 1040 from a storage device, such as a solid state drive, a hard disk drive, a CD-ROM, etc., into the memory device 1030.

The processor may execute the design tool 1040 to implement the system-on-chip. The design tool 1040 executed by the processor may implement the system-on-chip including the tapless standard cell based on an RTL netlist 940 for the system-on-chip, a tapless standard cell library 945, and a timing adjusting script 957 for applying a slow corner timing parameter that is adjusted to correspond to an increased slow corner by reflecting body biasing and a fast corner timing parameter that is adjusted to correspond to a decreased fast corner by reflecting the body biasing. In some example embodiments, the timing adjusting script 957 for applying the timing parameters adjusted according to the design window reduction may be stored as an electronic file in the storage device, and the processor may execute the timing adjusting script 957 stored in the storage device. In other example embodiments, while the processor executes the design tool 1040, an SOC designer 1060 may input the timing adjusting script 957 for applying the timing parameters adjusted according to the design window reduction to the design tool 1040 via an input device, such as a keyboard. The processor may execute a synthesis tool 1041, a placement and routing tool 1043 and a static timing analysis tool 1045.

The synthesis tool 1041 executed by the processor may generate a gate level netlist 947 for the system-on-chip by synthesizing the RTL netlist 940 based on the tapless standard cell library 945. The placement and routing tool 1043 may apply the adjusted timing parameters in response to the timing adjusting script 957, and may generate layout data 960 for the system-on-chip by placing and routing components of the system-on-chip based on the adjusted timing parameters, the tapless standard cell library 945 and the gate level netlist 947. The static timing analysis tool 1045 may verify a timing of the layout data 960 for the system-on-chip based on the adjusted timing parameters applied in response to the timing adjusting script 957.

The system-on-chip may be manufactured and packaged based on the layout data 960 where the timing verification is completed. Accordingly, the system-on-chip illustrated in FIG. 7A through FIG. 9 may be manufactured.

Figure 14:
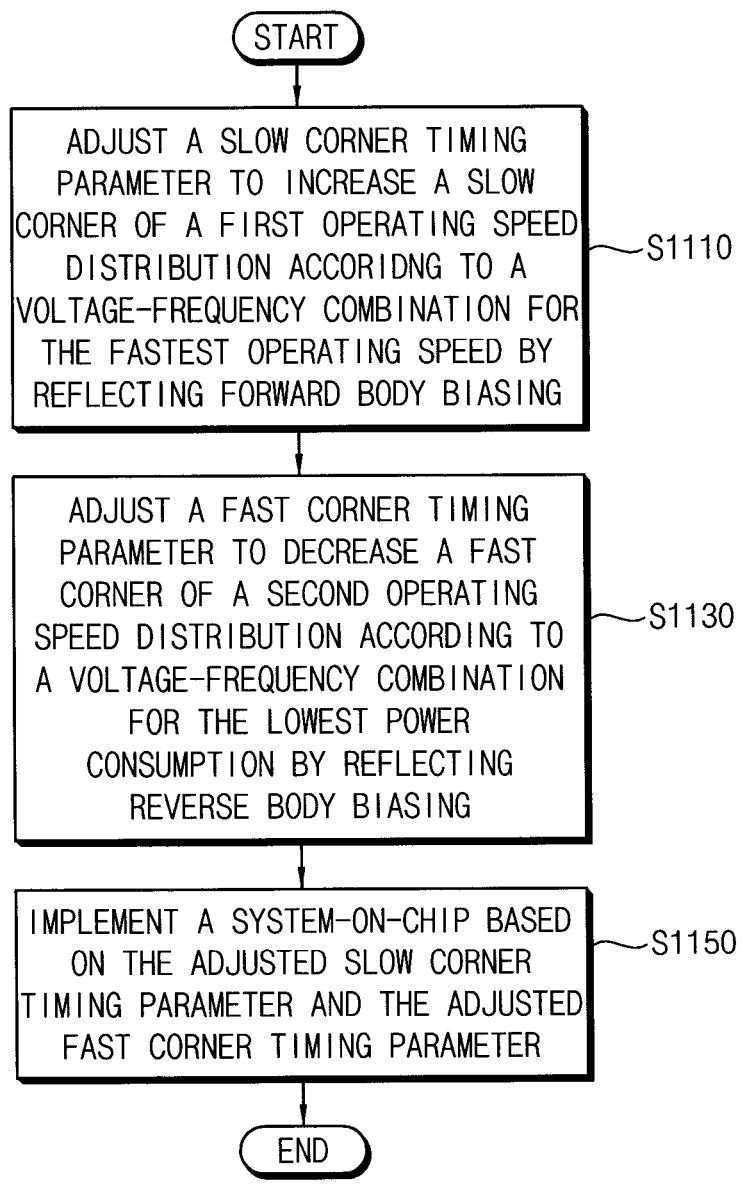
FIG. 14 is a flow chart illustrating a method of designing a system-on-chip including a tapless standard cell according to example embodiments.
Figure 15:
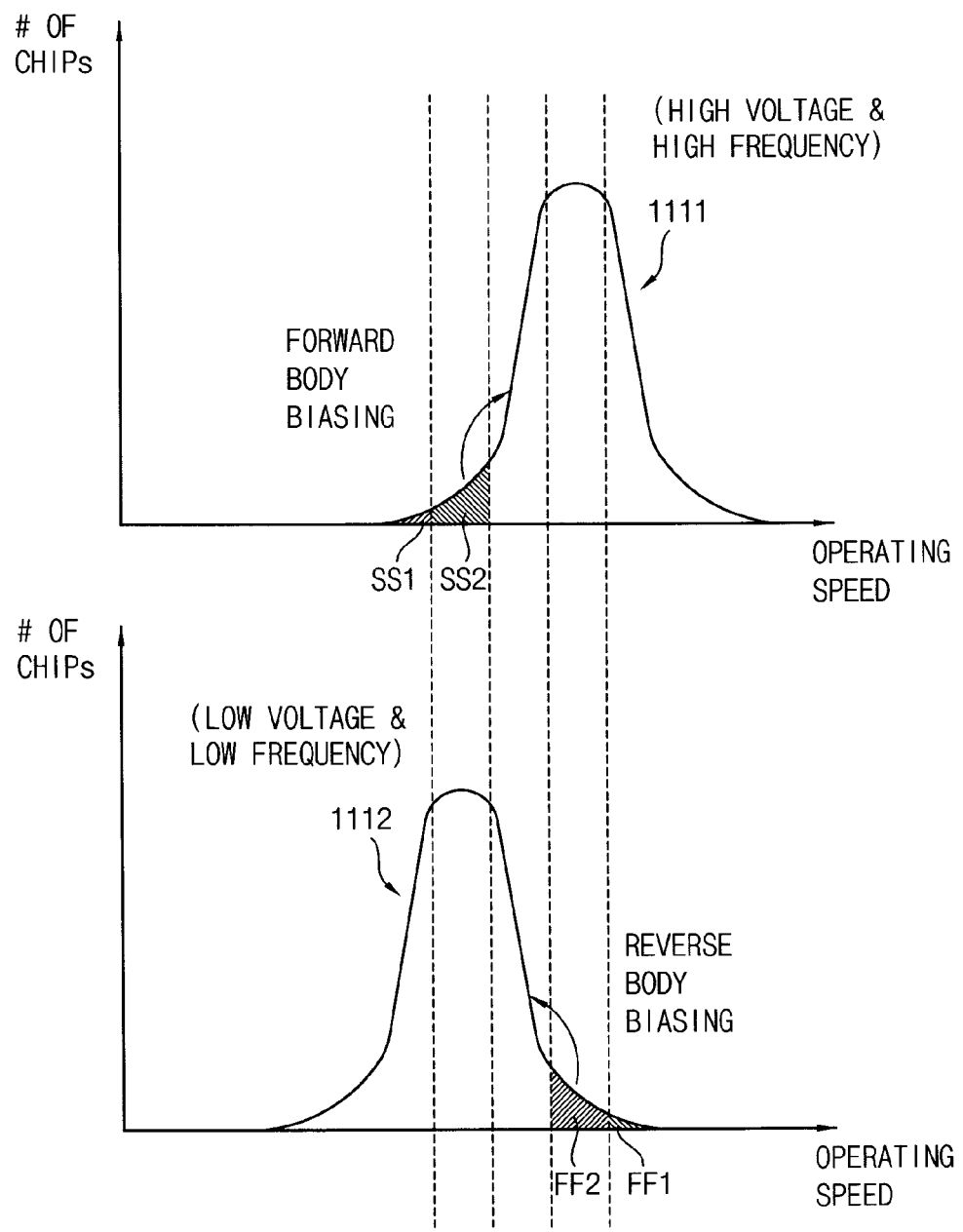
FIG. 15 is a diagram illustrating an example of a design window reduction performed by a design method according to example embodiments.

FIG. 14 is a flow chart illustrating a method of designing a system-on-chip including a tapless standard cell according to example embodiments, and FIG. 15 is a diagram illustrating an example of a design window reduction performed by a design method according to example embodiments.

The design method illustrated in FIG. 14 may be applied to a system-on-chip where a dynamic voltage frequency scaling (DVFS) that dynamically adjusts a power supply voltage and a clock frequency is applied. The method of designing the system-on-chip including a tapless standard cell according to example embodiments may change at least one corner of at least one of a plurality of operating speed distributions for the system-on-chip according to a plurality of power supply voltages and a plurality of clock frequencies by reflecting body biasing.

Referring to FIGS. 14 and 15, with respect to a first operating speed distribution 1111 according to a voltage-frequency combination for the fastest operating speed among a plurality of voltage-frequency combinations, or with respect to the first operating speed distribution 1111 according to the highest power supply voltage among the plurality of power supply voltages and the highest clock frequency among the plurality of clock frequencies, a slow corner timing parameter may be adjusted to increase a slow corner of the first operating speed distribution 1111 from a first slow corner SS1 to a second slow corner SS2 by reflecting forward body biasing (S1110).

Further, with respect to a second operating speed distribution 1112 according to a voltage-frequency combination for the lowest power consumption among the plurality of voltage-frequency combinations, or with respect to the second operating speed distribution 1112 according to the lowest power supply voltage among the plurality of power supply voltages and the lowest clock frequency among the plurality of clock frequencies, a fast corner timing parameter may be adjusted to decrease a fast corner of the second operating speed distribution 1112 from a first fast corner FF1 to a second fast corner FF2 by reflecting reverse body biasing (S1130).

The system-on-chip including the tapless standard cell may be implemented based on the adjusted timing parameters corresponding to the changed corners SS2 and FF2 (S1150). For example, a synthesis, a placement and routing and/or a static timing analysis of the system-on-chip may be performed based on the adjusted timing parameters, and thus the system-on-chip including the tapless standard cell may be implemented and manufactured corresponding to the timing parameters adjusted according to a design window reduction. According to example embodiments, during implementing and manufacturing the system-on-chip, the adjusted timing parameters may be applied by using a tapless standard cell library including the adjusted timing parameters or by using a timing adjusting script for applying the adjusted timing parameters.

As described above, since at least one corner of at least one of the plurality of operating speed distributions according to the plurality of voltage-frequency combinations, the operating speed of the system-on-chip designed based on the changed corner may be increased, or the power consumption and the size of the system-on-chip designed based on the changed corner may be decreased.

In a case where the system-on-chip implemented and manufactured by the design method illustrated in FIG. 14 is in the second slow corner SS2, forward body biasing may be applied to the system-on-chip while the highest power supply voltage is supplied to the system-on-chip and the system-on-chip operates at the highest clock frequency. In a case where the system-on-chip implemented and manufactured by the design method illustrated in FIG. 14 is in the second fast corner FF2, reverse body biasing may be applied to the system-on-chip while the lowest power supply voltage is supplied to the system-on-chip and the system-on-chip operates at the lowest clock frequency. Accordingly, a yield for the system-on-chip may be substantially maintained.

Although FIGS. 14 and 15 illustrate an example where a slow corner of a voltage-frequency combination for the fastest operating speed and a fast corner of a voltage-frequency combination for the lowest power consumption are changed, according to example embodiments, at least one corner of any voltage-frequency combination may be changed. For example, slow corners and fast corners of all operating speed distributions according to all voltage-frequency combinations may be changed.

Figure 16:
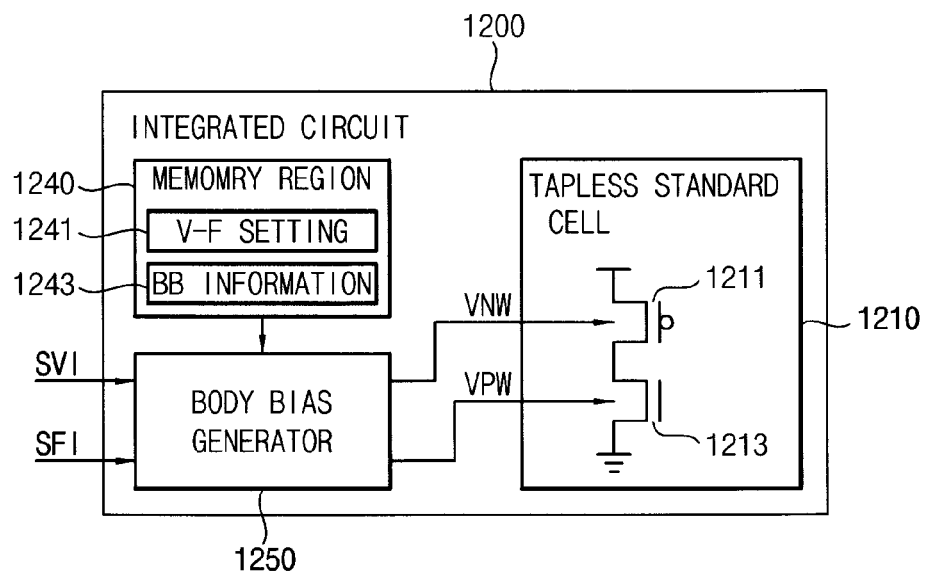
FIG. 16 is a block diagram illustrating an example of a system-on-chip including a tapless standard cell according to example embodiments.

FIG. 16 is a block diagram illustrating an example of a system-on-chip including a tapless standard cell according to example embodiments.

Referring to FIG. 16, a system-on-chip may be implemented and manufactured as an integrated circuit 1200 including at least one tapless standard cell 1210, a memory region 1240 and a body bias generator 1250. The system-on-chip may be any system-on-chip which is designed in a semi-custom methodology based on a standard cell and which a DVFS is applied to. For example, the system-on-chip may be a mobile SOC, an application processor, a media processor, a microprocessor, a central processing unit (CPU), etc.

The tapless standard cell 1210 may be implemented based on a timing parameter that is adjusted according to a design window reduction by reflecting body biasing. That is, the slow corner and/or the fast corner may be newly set when designing the tapless standard cell 1210.

The memory region 1240 may store voltage-frequency setting information 1241 about a voltage-frequency combination where the slow corner and/or the fast corner are newly set, and may store body bias information 1243 representing whether the system-on-chip is in the newly set corner. In some example embodiments, the memory region 1240 may be implemented with a nonvolatile memory device. In other example embodiments, the memory region 1240 may be implemented with a register or a volatile memory device, and the voltage-frequency setting information 1241 and the body bias information 1243 may be provided from an external device to the memory region 1240 during an initialization sequence of the system-on-chip.

The body bias generator 1250 may receive a voltage information signal SVI representing a current power supply voltage of the system-on-chip and a frequency information signal SFI representing a current clock frequency of the system-on-chip from an internal or external controller, and may read the voltage-frequency setting information 1241 and the body bias information 1243 from the memory region 1240. In a case where the voltage information signal SVI and the frequency information signal SFI indicate a voltage-frequency combination included in the voltage-frequency setting information 1241, and the body bias information 1243 indicates that the system-on-chip is in the newly set corner, the body bias generator 1250 may apply a body bias voltage VNW and VPW to a PMOS transistor 1211 and/or an NMOS transistor 1213 of the tapless standard cell 1210. According to example embodiments, the body bias generator 1250 may be located inside or outside the integrated circuit 1200.

As described above, since the system-on-chip is implemented based on a timing parameter adjusted according to a design window reduction by reflecting body biasing, the operating speed of the system-on-chip including the tapless standard cell 1210 may be increased, and the power consumption and the size of the tapless standard cell 1210 and the system-on-chip may be decreased. Further, since body biasing is applied to the system-on-chip in the newly set corner, a yield for the system-on-chip may be substantially maintained although the design window is reduced.

Figure 17:
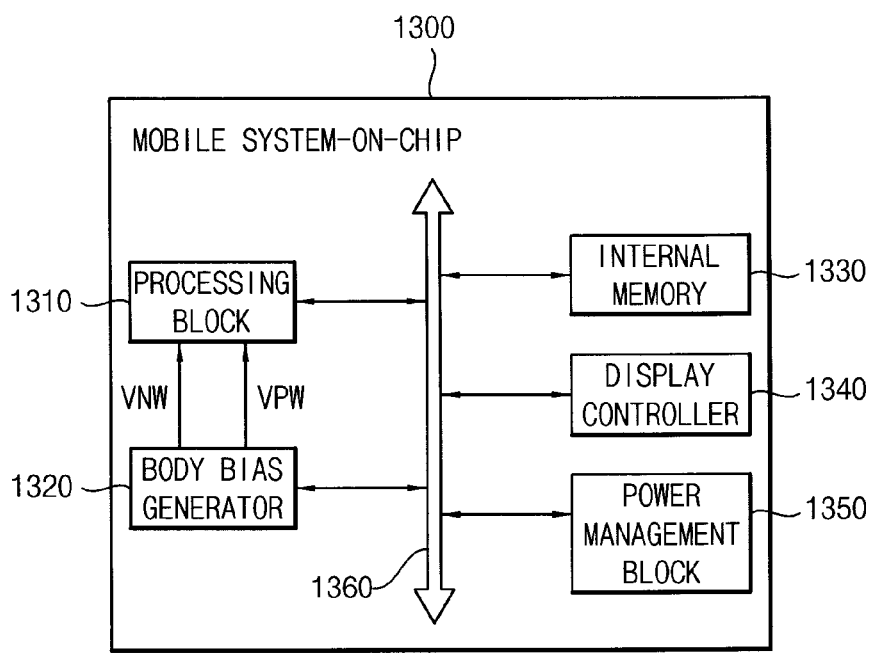
FIG. 17 is a block diagram illustrating a system-on-chip according to example embodiments.

FIG. 17 is a block diagram illustrating a system-on-chip according to example embodiments.

Referring to FIG. 17 a system-on-chip 1300, such as a mobile SOC, includes a processing block 1310, a body bias generator 1320, an internal memory device 1330, a display controller 1340, a power management block 1350 and a bus 1360.

The processing block 1310 may perform specific calculations or tasks. The processing block 1310 may control the internal memory device 1330, the display controller 1340 and the power management block 1350 via the bus 1360. The internal memory device 1330 may store commands and/or data processed by the processing block 1310. The display controller 1340 may control an external display device. The power management block 1350 may control a power state of the system-on-chip 1300. According to example embodiments, the system-on-chip 1300 may further include a three dimensional (3D) module, a memory controller, a direct memory access (DMA) controller, an interrupt controller, etc.

At least one block included in the system-on-chip 1300 may be designed in a semi-custom methodology based on a standard cell, and a design window reduction according to example embodiments, for example as described above with reference to any or FIGS. 1-16, may be applied during the designing process. For example, the processing block 1310 may include a tapless standard cell where the design window reduction according to example embodiments is applied. The body bias generator 1320 may apply a body bias voltage to the tapless standard cell where the design window reduction is applied. For example, the body bias generator 1320 may apply a forward body bias voltage to the tapless standard cell in a case where the system-on-chip 1300 is in a newly set slow corner, and may apply a reverse body bias voltage to the tapless standard cell in a case where the system-on-chip 1300 is in a newly set fast corner.

As described above, since at least one block of the system-on-chip 1300 is designed based on the design window reduction, the operating speed of the system-on-chip 1300 (e.g., the mobile SOC) according to example embodiments may be improved, and the power consumption and the size of the system-on-chip 1300 may be reduced.

Figure 18:
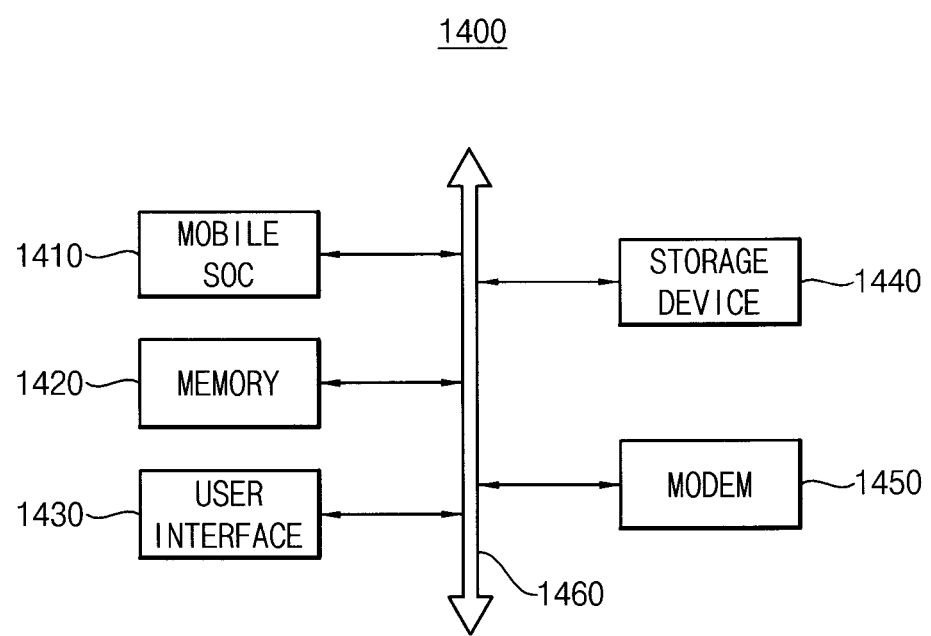
FIG. 18 is a block diagram illustrating a computing system including a system-on-chip according to example embodiments.

FIG. 18 is a block diagram illustrating a computing system including a system-on-chip according to example embodiments.

Referring to FIG. 18, a computing system 1400 includes a processor 1410 (e.g., a mobile SOC), a memory device 1420, a user interface 1430, a storage device 1440, a modem 1450 (e.g., a baseband chipset) and a bus 1460.

The processor 1410 may perform specific calculations or tasks. The processor 1410 may be a system-on-chip which is designed in a semi-custom methodology and implements design window reduction according to example embodiments, for example design window reduction as described above with reference to any or FIGS. 1-16. For example, the processor 1410 may be a mobile SOC, an application processor, a media processor, a microprocessor, a central processing unit (CPU), a digital signal processor, or the like. The processor 1410 may be coupled to the memory device 1420 via a bus 1460, such as an address bus, a control bus and/or a data bus. For example, the memory device 1420 may be implemented by a dynamic random access memory (DRAM), a mobile DRAM, a static random access memory (SRAM), a phase random access memory (PRAM), a ferroelectric random access memory (FRAM), a resistive random access memory (RRAM), a magnetic random access memory (MRAM), etc. Further, the processor 1410 may be coupled to an extension bus, such as a peripheral component interconnect (PCI) bus, and may control the user interface 1430 including at least one input device, such as a keyboard, a mouse, a touch screen, etc., and at least one output device, a printer, a display device, etc. Further, the processor 1410 may control the storage device 1440, such as a solid state drive, a hard disk drive, a CD-ROM, etc. The modem 1450 may perform wired or wireless communication with an external device. In some example embodiments, the computing system 1400 may further include a power supply, an application chipset, a camera image processor (CIS), etc.

The processor 1410 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

According to example embodiments, the computing system 1400 may be any computing system, such as a mobile phone, a smart phone, a music player, a personal digital assistants (PDA), a portable multimedia player (PMP), a laptop computer, a tablet computer, a digital television, a digital camera, a portable game console, etc.

Example embodiments may be applied to a semi-custom methodology based on a standard cell. For example, example embodiments may be applied to any semiconductor device that is designed in the semi-custom methodology, such as a mobile SOC, an application processor, a media processor, a microprocessor, a central processing unit (CPU), etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of designing a system-on-chip including a tapless standard cell to which body biasing is applied, the method comprising:
    adjusting a slow corner timing parameter to increase a slow corner of an operating speed distribution for the system-on-chip by forward body biasing, the slow corner timing parameter corresponding to a lowest value of an operating speed design window of the system-on-chip;
    wherein the slow corner timing parameter includes at least one of a slow corner cell delay, a slow corner setup margin and a slow corner hold margin of the tapless standard cell;
    adjusting a fast corner timing parameter to decrease a fast corner of the operating speed distribution for the system-on-chip by reflecting reverse body biasing, the fast corner timing parameter corresponding to a highest value of the operating speed design window of the system-on-chip;
    wherein the fast corner timing parameter includes at least one of a fast corner cell delay, a fast corner setup margin and a fast corner hold margin of the tapless standard cell; and
    implementing, by using a processor, the system-on-chip including the tapless standard cell based on the adjusted slow corner timing parameter corresponding to the increased slow corner and the adjusted fast corner timing parameter corresponding to the decreased fast corner.

2. The method of claim 1, wherein adjusting the slow corner timing parameter comprises:
    adjusting the slow corner cell delay of the tapless standard cell.

3. The method of claim 2, wherein the slow corner cell delay is decreased to increase the slow corner.

4. The method of claim 1, wherein adjusting the fast corner timing parameter comprises:
    adjusting the fast corner cell delay of the tapless standard cell.

5. The method of claim 4, wherein the fast corner cell delay is increased to decrease the fast corner.

6. The method of claim 1, wherein implementing the system-on-chip comprises:
    implementing the system-on-chip including the tapless standard cell by using a tapless standard cell library including the adjusted slow corner timing parameter and the adjusted fast corner timing parameter.

7. The method of claim 1, wherein implementing the system-on-chip comprises:
    generating a tapless standard cell library including the adjusted slow corner timing parameter and the adjusted fast corner timing parameter;
    generating a gate level netlist by synthesizing a register-transfer level netlist for the system-on-chip based on the tapless standard cell library;
    placing and routing components of the system-on-chip based on the tapless standard cell library and the gate level netlist; and
    verifying a timing of the system-on-chip based on the adjusted slow corner timing parameter and the adjusted fast corner timing parameter included in the tapless standard cell library.

8. The method of claim 1, wherein implementing the system-on-chip comprises:
    implementing the system-on-chip including the tapless standard cell by using a timing adjusting script for applying the adjusted slow corner timing parameter and the adjusted fast corner timing parameter.

9. The method of claim 1, wherein implementing the system-on-chip comprises:
    generating a timing adjusting script for applying the adjusted slow corner timing parameter and the adjusted fast corner timing parameter;
    generating a gate level netlist by synthesizing a register-transfer level netlist for the system-on-chip;
    applying the adjusted slow corner timing parameter and the adjusted fast corner timing parameter to the gate level netlist in response to the timing adjusting script;
    placing and routing components of the system-on-chip based on the gate level netlist to which the adjusted slow corner timing parameter and the adjusted fast corner timing parameter are applied; and
    verifying a timing of the system-on-chip based on the adjusted slow corner timing parameter and the adjusted fast corner timing parameter that are applied in response to the timing adjusting script.

10. A designing system for designing a system-on-chip including a tapless standard cell to which body biasing is applied, the designing system comprising:
    a memory device configured to load a design tool for designing the system-on-chip; and
    a processor configured to execute the design tool loaded in the memory device,
    wherein the design tool executed by the processor causes the designing system to perform,
        a slow corner changing step of adjusting a slow corner timing parameter to increase a slow corner of an operating speed distribution for the system-on-chip by reflecting forward body biasing, the slow corner timing parameter corresponding to a lowest value of an operating speed design window of the system-on-chip;

wherein the slow corner timing parameter includes at least one of a slow corner cell delay, a slow corner setup margin and a slow corner hold margin of the tapless standard cell;

a fast corner changing step of adjusting a fast corner timing parameter to decrease a fast corner of the operating speed distribution for the system-on-chip by reflecting reverse body biasing, the fast corner timing parameter corresponding to a highest value of the operating speed design window of the system-on-chip;

wherein the fast corner timing parameter includes at least one of a fast corner cell delay, a fast corner setup margin and a fast corner hold margin of the tapless standard cell; and an implementing step of implementing the system-on-chip including the tapless standard cell based on the adjusted slow corner timing parameter corresponding to the increased slow corner and the adjusted fast corner timing parameter corresponding to the decreased fast corner.

11. The designing system of claim 10, wherein the processor is configured to execute the design tool such that implementing the system-on-chip including the tapless standard cell includes using a tapless standard cell library including the adjusted slow corner timing parameter and the adjusted fast corner timing parameter.

12. The designing system of claim 10, wherein the processor is configured to execute the design tool such that implementing the system-on-chip including the tapless standard cell includes using a timing adjusting script for applying the adjusted slow corner timing parameter and the adjusted fast corner timing parameter.

13. A system-on-chip, comprising:
at least one tapless standard cell to which body biasing is applied; and
a body bias generator configured to apply a body bias voltage to the tapless standard cell,
wherein the system-on-chip is implemented by performing,
a slow corner changing step of adjusting a slow corner timing parameter to increase a slow corner of an operating speed distribution for the system-on-chip by reflecting forward body biasing, the slow corner timing parameter corresponding to a lowest value of an operating speed design window of the system-on-chip;
wherein the slow corner timing parameter includes at least one of a slow corner cell delay, a slow corner setup margin and a slow corner hold margin of the tapless standard cell;
a fast corner changing step of adjusting a fast corner timing parameter to decrease a fast corner of the operating speed distribution for the system-on-chip by reflecting reverse body biasing, the fast corner timing parameter corresponding to a highest value of the operating speed design window of the system-on-chip;
wherein the fast corner timing parameter includes at least one of a fast corner cell delay, a fast corner setup margin and a fast corner hold margin of the tapless standard cell; and
an implementing step of implementing the system-on-chip including the tapless standard cell based on the adjusted slow corner timing parameter corresponding to the increased slow corner and the adjusted fast corner timing parameter corresponding to the decreased fast corner.

14. The system-on-chip of claim 13, wherein the body bias generator is configured to apply a forward body bias voltage to the tapless standard cell if the system-on-chip is in the increased slow corner, and is configured to apply a reverse body bias voltage to the tapless standard cell if the system-on-chip is in the decreased fast corner.

15. The system-on-chip of claim 14, wherein the body bias generator is configured to apply the forward body bias voltage lower than a power supply voltage to a body of a PMOS transistor included in the tapless standard cell if the system-on-chip is in the increased slow corner, and is configured to apply the reverse body bias voltage higher than the power supply voltage to the body of the PMOS transistor included in the tapless standard cell if the system-on-chip is in the decreased fast corner.

16. The system-on-chip of claim 14, wherein the body bias generator is configured to apply the forward body bias voltage higher than a power supply voltage to a body of an NMOS transistor included in the tapless standard cell if the system-on-chip is in the increased slow corner, and is configured to apply the reverse body bias voltage lower than the power supply voltage to the body of the NMOS transistor included in the tapless standard cell if the system-on-chip is in the decreased fast corner.

17. A method of designing a system-on-chip to which dynamic voltage frequency scaling is applied, the system-on-chip including a tapless standard cell to which body biasing is applied, the method comprising:
adjusting a slow corner timing parameter to increase a slow corner of a first operating speed distribution for the system-on-chip according to a highest power supply voltage among a plurality of power supply voltages and a highest clock frequency among a plurality of clock frequencies by reflecting forward body biasing, the slow corner timing parameter corresponding to a lowest value of an operating speed design window of the system-on-chip;
wherein the slow corner timing parameter includes at least one of a slow corner cell delay, a slow corner setup margin and a slow corner hold margin of the tapless standard cell;
adjusting a fast corner timing parameter to decrease a fast corner of a second operating speed distribution for the system-on-chip according to a lowest power supply voltage among the plurality of power supply voltages and a lowest clock frequency among the plurality of clock frequencies by reflecting reverse body biasing, the fast corner timing parameter corresponding to a highest value of the operating speed design window of the system-on-chip;
wherein the fast corner timing parameter includes at least one of a fast corner cell delay, a fast corner setup margin and a fast corner hold margin of the tapless standard cell; and
implementing, by using a processor, the system-on-chip including the tapless standard cell based on the adjusted slow corner timing parameter corresponding to the increased slow corner and the adjusted fast corner timing parameter corresponding to the decreased fast corner.

18. The method of claim 17, wherein the system-on-chip is implemented by configuring the body bias generator to receive information indicating a comparison between a current operating speed of the system-on-chip and at least one of the slow corner timing parameter and the fast corner timing parameter, and configuring the body bias generator to apply the body bias voltage to the tapless standard cell based on the comparison.

19. The method of claim 17, wherein the system-on-chip is implemented by configuring the body bias generator to apply the body bias voltage to the tapless standard cell such that the operating speed of the system-on-chip is adjusted to fall within the operating speed design window.

* * * * *